(12) United States Patent
Tsai et al.

(10) Patent No.: US 8,390,940 B2
(45) Date of Patent: Mar. 5, 2013

(54) PHOTOGRAPHING OPTICAL LENS ASSEMBLY

(75) Inventors: Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 24 days.

(21) Appl. No.: 13/269,957

(22) Filed: Oct. 10, 2011

(65) Prior Publication Data
US 2013/0033762 A1 Feb. 7, 2013

(30) Foreign Application Priority Data
Aug. 5, 2011 (TW) .............................. 100128076 A

(51) Int. Cl.
*G02B 13/18* (2006.01)
*G02B 9/60* (2006.01)
(52) U.S. Cl. ....................... 359/713; 359/764
(58) Field of Classification Search .................. 359/713, 359/763, 764
See application file for complete search history.

(56) References Cited

U.S. PATENT DOCUMENTS

| 7,365,920 B2 | 4/2008 | Noda | |
|---|---|---|---|
| 2012/0229917 A1* | 9/2012 | Huang | 359/713 |
| 2012/0314301 A1* | 12/2012 | Huang et al. | 359/713 |

* cited by examiner

*Primary Examiner* — Scott J Sugarman
(74) *Attorney, Agent, or Firm* — Maschoff Gilmore & Israelsen

(57) ABSTRACT

An photographing optical lens assembly includes, in order from an object side to an image side, a first lens element, a second lens element, a third lens element, a fourth lens element, a fifth lens element with positive refractive power and a sixth lens element with negative refractive power and a image plane. The third lens element, the fourth lens element, the fifth lens element and the sixth lens element each has an aspheric object-side surface and an aspheric image-side surface. The object-side surface of the first lens element is convex. The sixth lens element further comprises at least one inflection point and is made of plastic. By adjusting the refractive power of the first lens element and the photographing optical lens assembly, and adjusting the total length of the photographing optical lens assembly, the total volume of the lens assembly is reduced, and the image quality is improved.

25 Claims, 20 Drawing Sheets

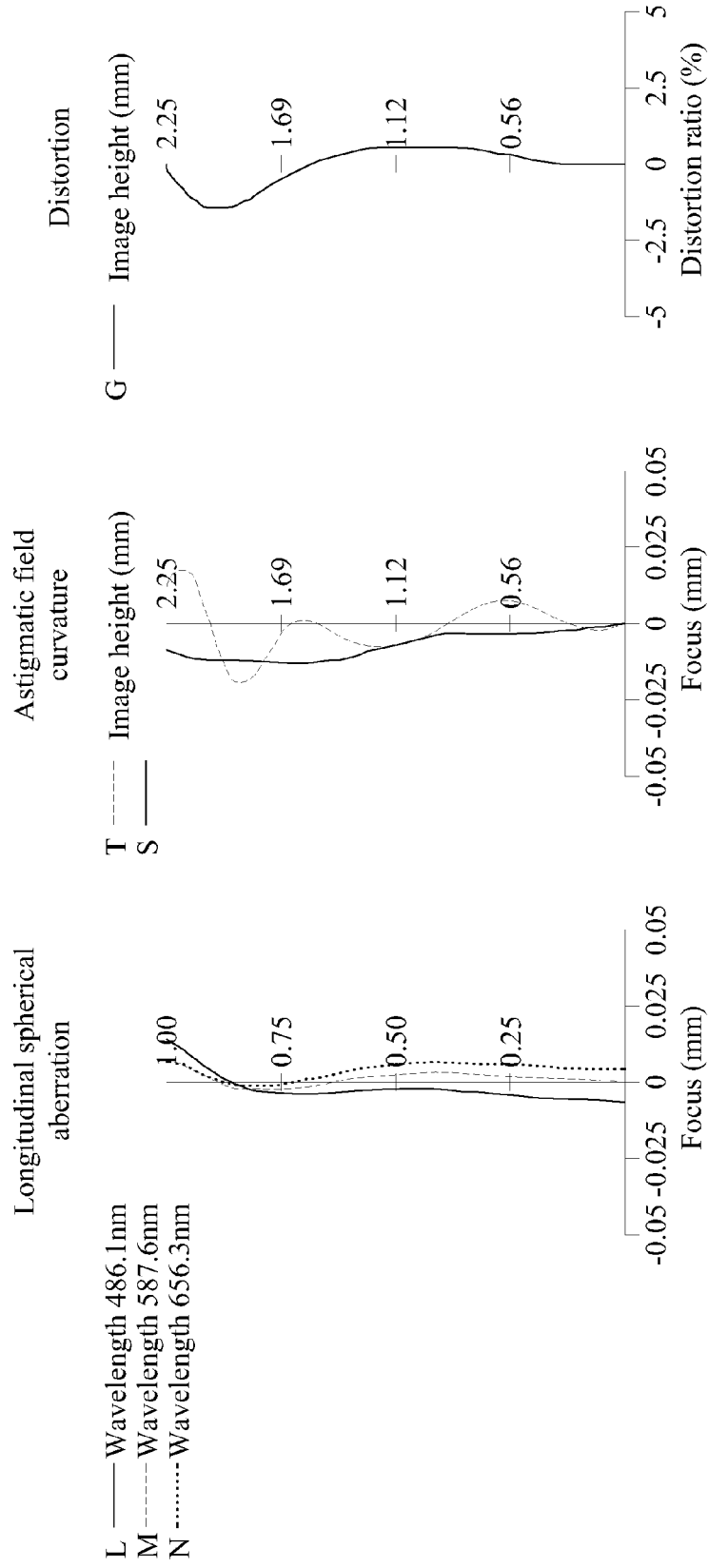

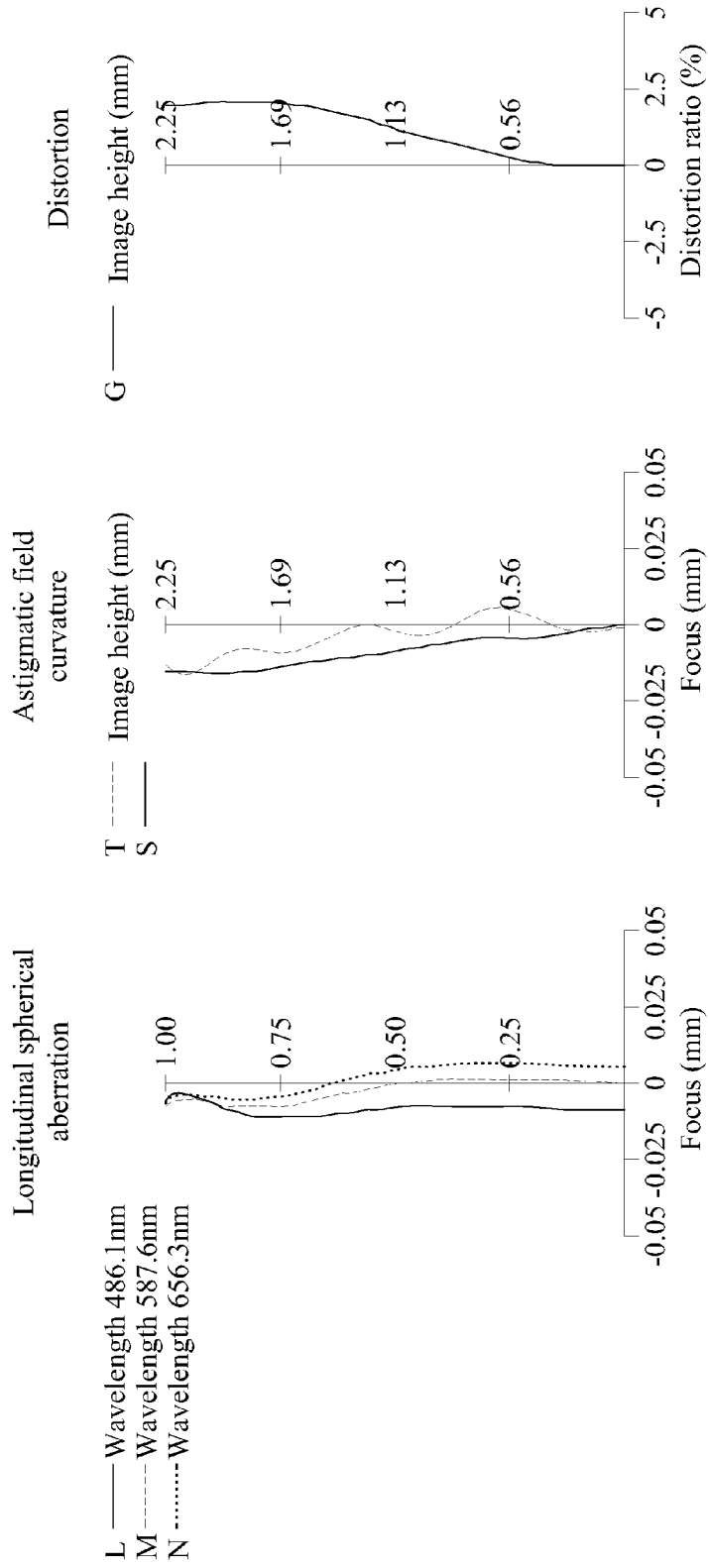

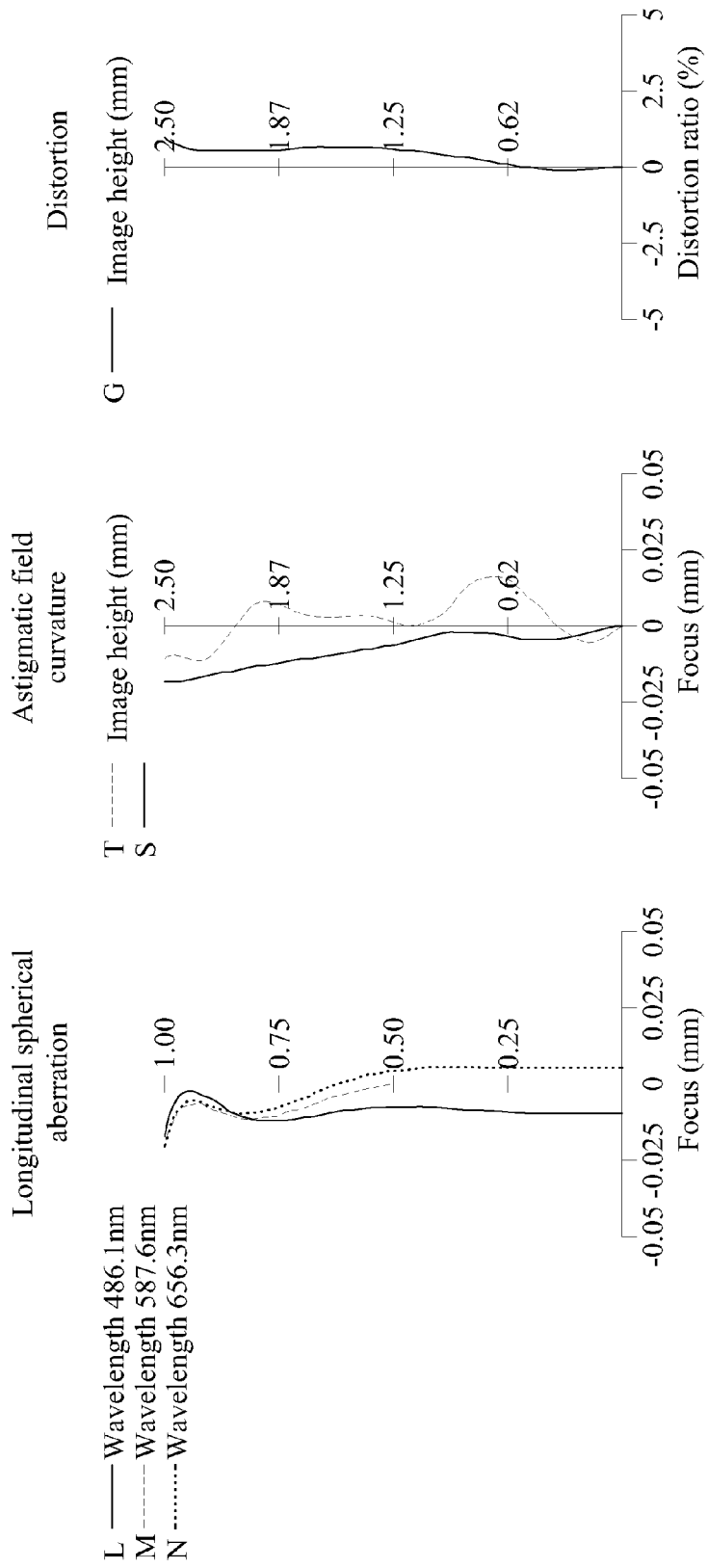

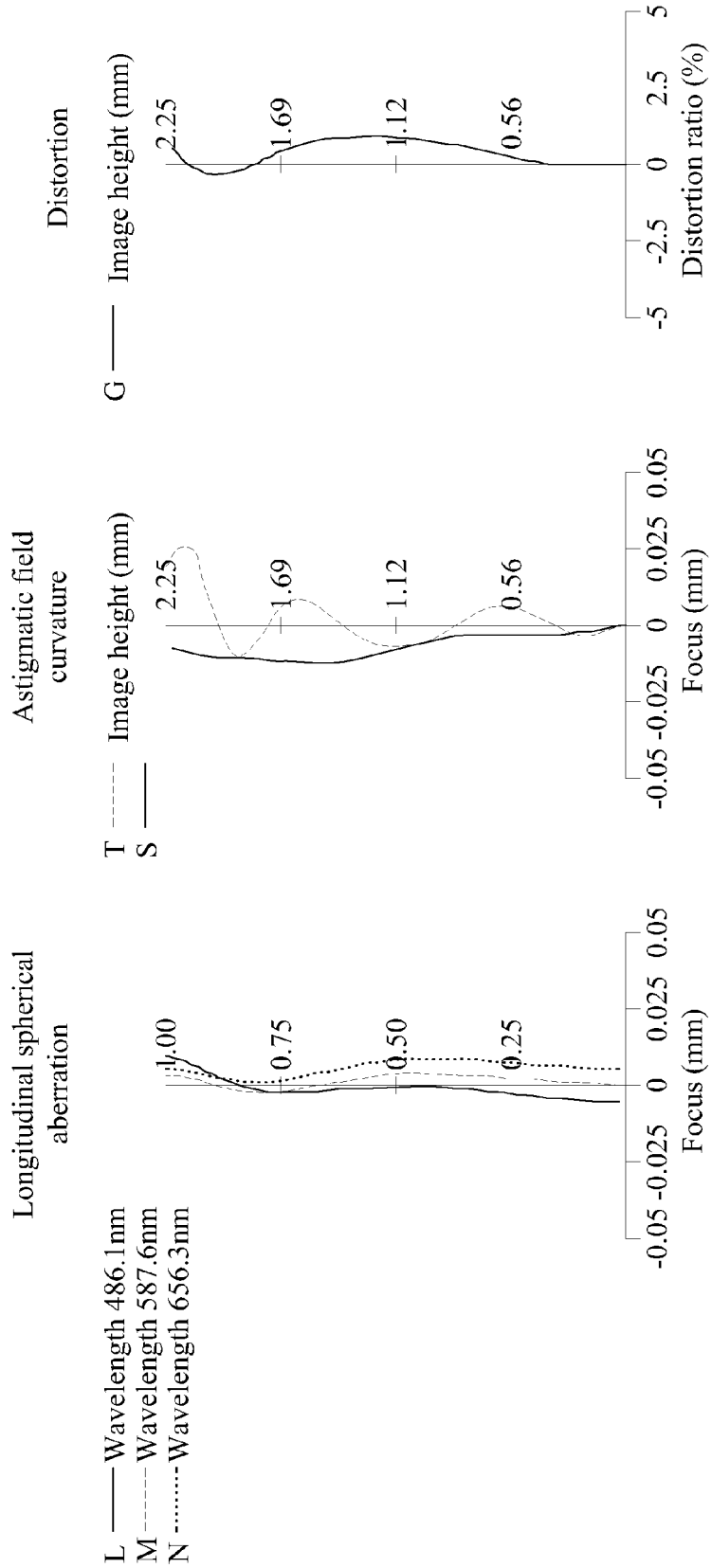

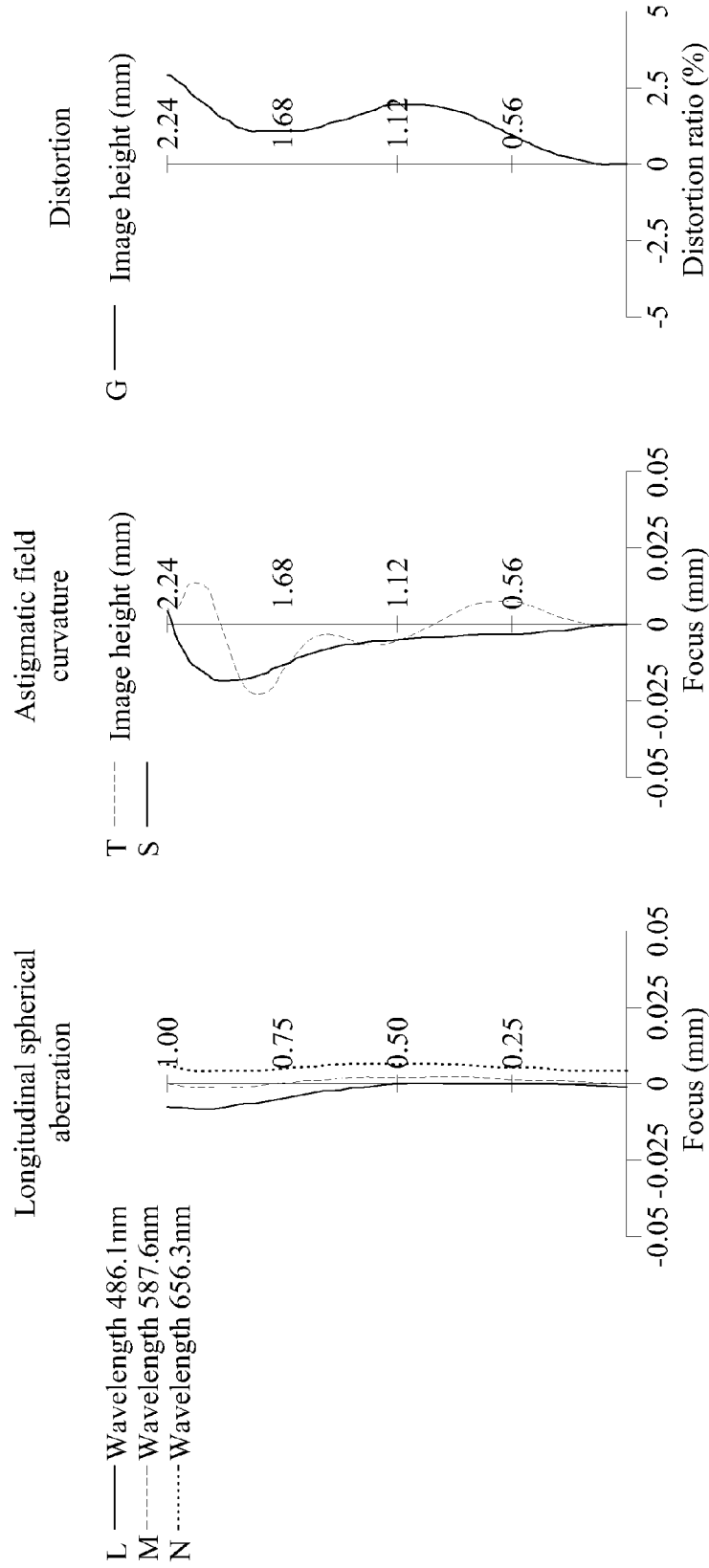

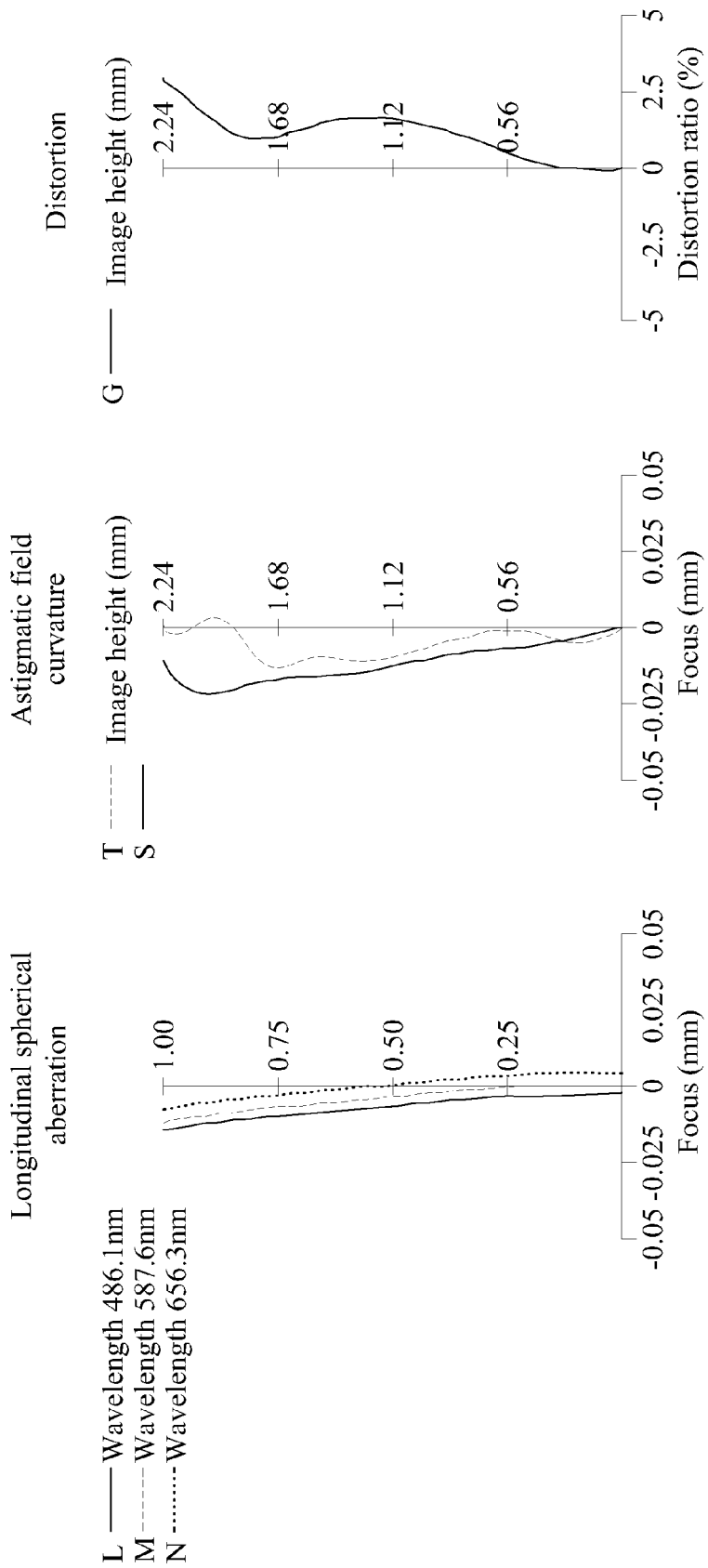

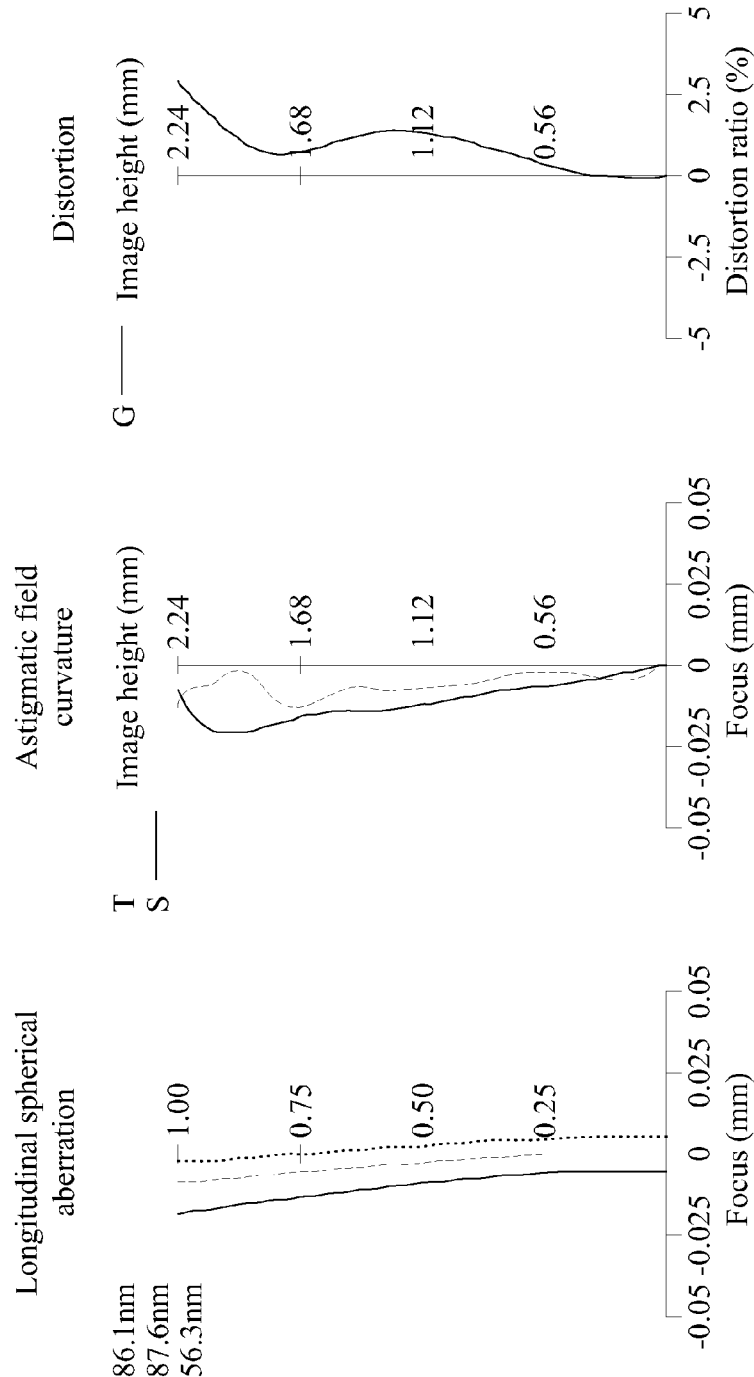

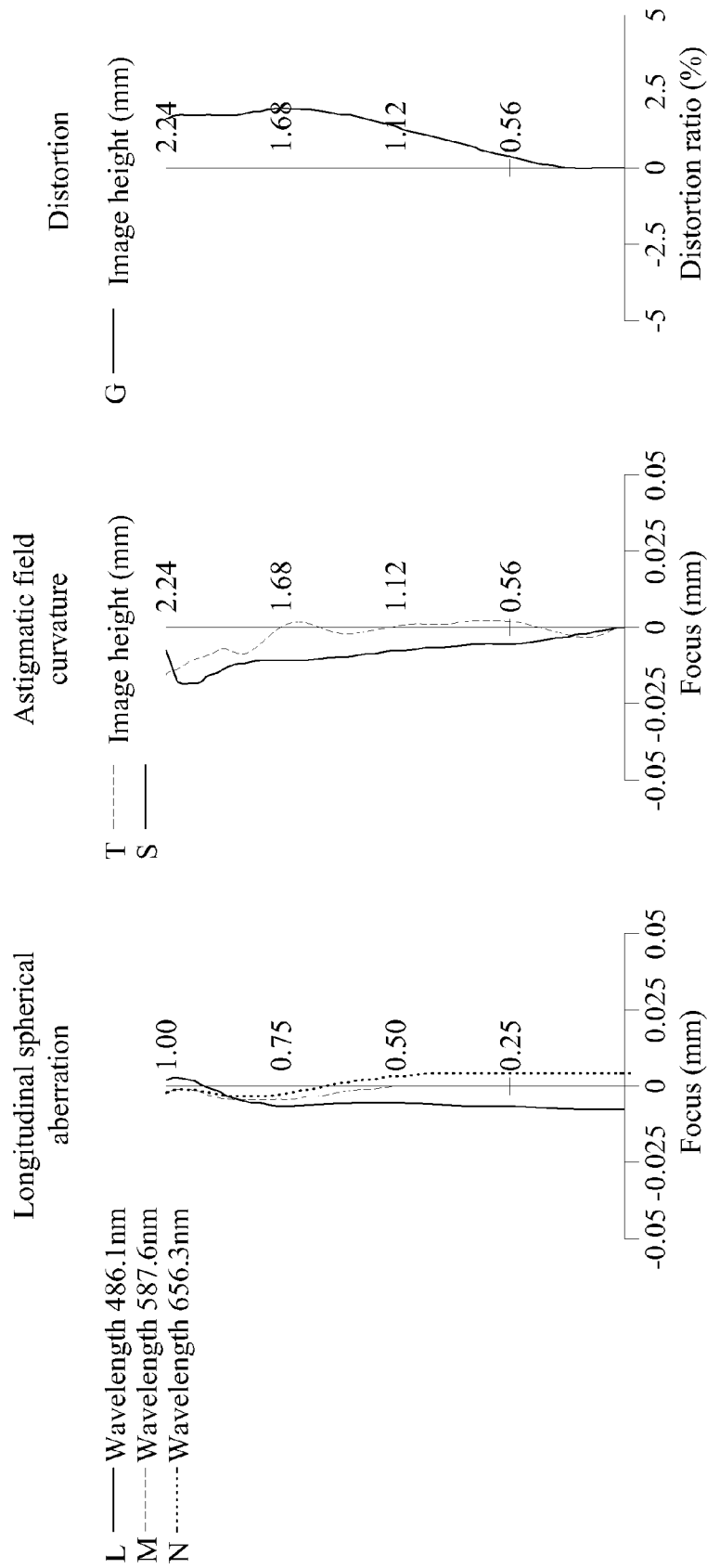

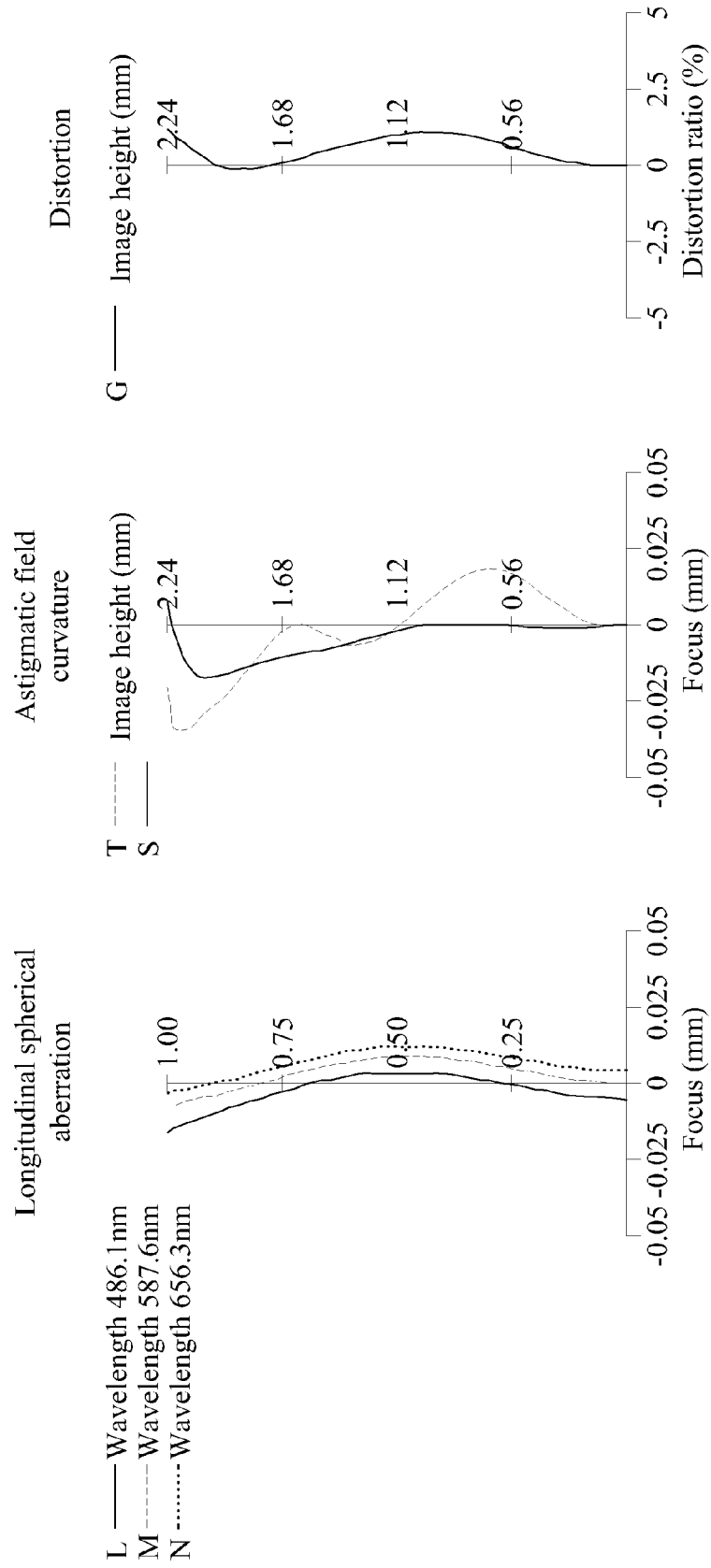

US 8,390,940 B2

PHOTOGRAPHING OPTICAL LENS ASSEMBLY

CROSS-REFERENCE TO RELATED APPLICATIONS

This non-provisional application claims priority under 35 U.S.C. §119(a) on Patent Application No(s). 100128076 filed in Taiwan, R.O.C. on Aug. 5, 2011, the entire contents of which are hereby incorporated by reference.

BACKGROUND

1. Technical Field

The present disclosure relates to a photographing optical lens assembly, and more particularly to a photographing optical lens assembly having multiple lenses.

2. Related Art

In recent years, with the prosperity of photographing optical lens assemblies, the demands for compact photographing cameras rise exponentially. The photo-sensing device, e.g. a sensor, of an ordinary photographing camera is commonly selected from a charge coupled device (CCD) and a complementary metal-oxide semiconductor (CMOS) device. In addition, with the advance of semiconductor manufacturing technology enabling the miniaturization of pixel size of sensors, the resolution of a compact optical lens assembly is gradually increased so there are increasing demands for compact optical lens assemblies capable of generating better quality images.

A conventional compact photographing lens used in a mobile electronic device usually consists of four lens elements, which is disclosed in U.S. Pat. No. 7,365,920. As the high technology mobile devices, such as smart phones or PDA (Personal Digital Assistant), gain in popularity, demands for the compact photographing lens with better resolution and image quality rise exponentially. However, the conventional four-lens assembly does not meet the requirement of the high-level photographing lens assembly. With the electronic devices heading towards the direction of high functionality while being as small and light as possible, the inventors recognize that optical imaging system capable of improving the image quality of mobile electronic devices as well as miniaturizing the overall size of the camera lens equipped therewith are urgently needed.

SUMMARY

According to an embodiment, a photographing optical lens assembly comprises, in order from an object side to an image side: a first lens element with positive refractive power, a second lens element, a third lens element, a fourth lens element, a fifth lens element with positive refractive power and a sixth lens element with negative refractive power. The first lens element comprises a convex object-side surface. The third lens element, the fourth lens element, the fifth lens element and the sixth lens element each has an aspheric object-side surface and an aspheric image-side surface. The sixth lens element further comprises at least one inflection point and is made of plastic.

The photographing optical lens assembly satisfies the following conditions:

$$0.4 < f/f_1 < 2.5; \text{ and} \quad \text{(Condition 1):}$$

$$2.5 \text{ millimeter (mm)} < TTL < 4.5 \text{ mm}; \quad \text{(Condition 2):}$$

Wherein f is the focal length of the photographing lens assembly; $f_1$ is the focal length of the first lens element; TTL is the axial distance between the object-side surface of the first lens element and the image plane.

According to another embodiment, a photographing optical lens assembly comprises, in order from an object side to an image side: a first lens element with positive refractive power, a second lens element, a third lens element, a fourth lens element, a fifth lens element with positive refractive power and a sixth lens element with negative refractive power. The first lens element comprises a convex object-side surface. The third lens element, the fourth lens element, the fifth lens element and the sixth lens element each has an aspheric object-side surface and an aspheric image-side surface. The image-side surface of the sixth lens element is concave. The sixth lens element further comprises at least one inflection point and is made of plastic.

The photographing optical lens assembly satisfies the following condition:

$$0.40 \text{ mm} < (CT_2 + CT_3 + CT_4) < 0.80 \text{ mm};$$

wherein $CT_2$ is the central thickness of the second lens element; $CT_3$ is the central thickness of the third lens element; $CT_4$ is the central thickness of the fourth lens element.

BRIEF DESCRIPTION OF THE DRAWINGS

The present disclosure will become more fully understood from the detailed description given herein below for illustration only, and thus are not limitative of the present disclosure, and wherein:

FIG. 1B is a graph of longitudinal spherical aberration curves when the lights having wavelengths of 486.1 nm, 587.6 nm, and 656.3 nm are respectively projected in the photographing optical lens assembly in FIG. 1A;

FIG. 1C is a graph of astigmatic field curves when the light having the wavelength of 587.6 nm is projected in the photographing optical lens assembly in FIG. 1A;

FIG. 1D is a graph of a distortion curve when the light having the wavelength of 587.6 nm is projected in the photographing optical lens assembly in FIG. 1A;

FIG. 2B is a graph of longitudinal spherical aberration curves when the lights having wavelengths of 486.1 nm, 587.6 nm, and 656.3 nm are respectively projected in the photographing optical lens assembly in FIG. 2A;

FIG. 2C is a graph of astigmatic field curves when the light having the wavelength of 587.6 nm is projected in the photographing optical lens assembly in FIG. 2A;

FIG. 2D is a graph of a distortion curve when the light having the wavelength of 587.6 nm is projected in the photographing optical lens assembly;

FIG. 3B is a graph of longitudinal spherical aberration curves when the lights having wavelengths of 486.1 nm, 587.6 nm, and 656.3 nm are respectively projected in the photographing optical lens assembly in FIG. 3A;

FIG. 3C is a graph of astigmatic field curves when the light having the wavelength of 587.6 nm is projected in the photographing optical lens assembly in FIG. 3A;

FIG. 3D is a graph of a distortion curve when the light having the wavelength of 587.6 nm is projected in the photographing optical lens assembly in FIG. 3A;

FIG. 4B is a graph of longitudinal spherical aberration curves when the lights having wavelengths of 486.1 nm, 587.6 nm, and 656.3 nm are respectively projected in the photographing optical lens assembly in FIG. 4A;

FIG. 4C is a graph of astigmatic field curves when the light having the wavelength of 587.6 nm is projected in the photographing optical lens assembly in FIG. 4A;

FIG. 4D is a graph of a distortion curve when the light having the wavelength of 587.6 nm is projected in the photographing optical lens assembly in FIG. 4A;

FIG. 5B is a graph of longitudinal spherical aberration curves when the lights having wavelengths of 486.1 nm, 587.6 nm, and 656.3 nm are respectively projected in the photographing optical lens assembly in FIG. 5A;

FIG. 5C is a graph of astigmatic field curves when the light having the wavelength of 587.6 nm is projected in the photographing optical lens assembly in FIG. 5A;

FIG. 5D is a graph of a distortion curve when the light having the wavelength of 587.6 nm is projected in the photographing optical lens assembly in FIG. 5A;

FIG. 6B is a graph of longitudinal spherical aberration curves when the lights having wavelengths of 486.1 nm, 587.6 nm, and 656.3 nm are respectively projected in the photographing optical lens assembly in FIG. 6A;

FIG. 6C is a graph of astigmatic field curves when the light having the wavelength of 587.6 nm is projected in the photographing optical lens assembly in FIG. 6A;

FIG. 6D is a graph of a distortion curve when the light having the wavelength of 587.6 nm is projected in the photographing optical lens assembly in FIG. 6A;

FIG. 7B is a graph of longitudinal spherical aberration curves when the lights having wavelengths of 486.1 nm, 587.6 nm, and 656.3 nm are respectively projected in the photographing optical lens assembly in FIG. 7A;

FIG. 7C is a graph of astigmatic field curves when the light having the wavelength of 587.6 nm is projected in the photographing optical lens assembly in FIG. 7A;

FIG. 7D is a graph of a distortion curve when the light having the wavelength of 587.6 nm is projected in the photographing optical lens assembly in FIG. 7A;

FIG. 8B is a graph of longitudinal spherical aberration curves when the lights having wavelengths of 486.1 nm, 587.6 nm, and 656.3 nm are respectively projected in the photographing optical lens assembly in FIG. 8A;

FIG. 8C is a graph of astigmatic field curves when the light having the wavelength of 587.6 nm is projected in the photographing optical lens assembly in FIG. 8A;

FIG. 8D is a graph of a distortion curve when the light having the wavelength of 587.6 nm is projected in the photographing optical lens assembly in FIG. 8A;

FIG. 9B is a graph of longitudinal spherical aberration curves when the lights having wavelengths of 486.1 nm, 587.6 nm, and 656.3 nm are respectively projected in the photographing optical lens assembly in FIG. 9A;

FIG. 9C is a graph of astigmatic field curves when the light having the wavelength of 587.6 nm is projected in the photographing optical lens assembly in FIG. 9A;

FIG. 9D is a graph of a distortion curve when the light having the wavelength of 587.6 nm is projected in the photographing optical lens assembly in FIG. 9A;

DETAILED DESCRIPTION

Figure 1A:
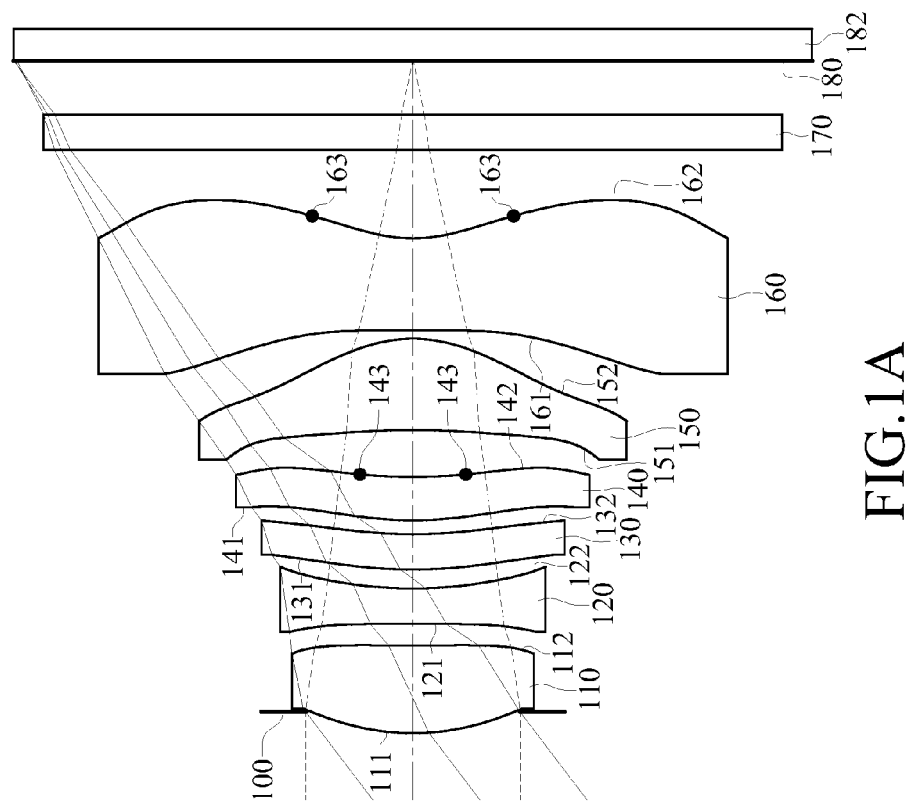
FIG. 1A is a schematic structural view of a first embodiment of a photographing optical lens assembly.

The photographing optical lens assembly of the present disclosure is described with FIG. 1A as an example to illustrate that the embodiments have similar lens combinations, configuration relationships, and the same conditions of the optical lens assembly. The differences are described in detail in the following embodiments other than the embodiment described in FIG. 1.

Taking FIG. 1A as an example, the photographing optical lens assembly 10 comprises, from an object side to an image side along an optical axis (from left to right in FIG. 1A) in sequence, a stop, a first lens element 110, a second lens element 120, a third lens element 130, a fourth lens element 140, a fifth lens element 150, and a sixth lens element 160, an infrared filter 170 and an image sensor 182 disposed on an image plane 180. In this embodiment, the stop is, for example, an aperture stop 100.

The first lens element 110 comprises an object-side surface 111 and an image-side surface 112. The refractive power of the first lens element 110 is positive for providing a part of the total refractive power needed by the photographing optical lens assembly 10, and, therefore, reducing the total optical length of the photographing optical lens assembly 10. In addition, when the object-side surface 111 is convex, the positive refractive power of the first lens element 110 rises which makes the total optical length of the photographing optical lens assembly 10 become shorter.

The second lens element 120 comprises an object-side surface 121 and an image-side surface 122. The refractive power of the second lens element 120 is negative for correcting the aberration of the photographing optical lens assembly 10.

The third lens element 130 comprises an object-side surface 131 and an image-side surface 132.

The fourth lens element 140 comprises an object-side surface 141 and an image-side surface 142. In this and some embodiments, the fourth lens element 140 comprises at least one inflection point 143 for reducing the angle of incidence on the image sensor 182, and, therefore, correcting the off-axis aberrations. In addition, the object-side surface 141 may be convex for correcting the aberration of the photographing lens assembly 10.

The fifth lens element 150 comprises a concave object-side surface 151 and a convex image-side surface 152 and has positive refractive power. In addition, it is favorable to shorten the total optical length of the photographing lens assembly 10 when either the object-side surface 151 is concave, or the image-side surface 152 is convex. On the other hand, enough space for accommodating other elements at the back of the photographing lens assembly 10 is formed when the object-side surface 151 is concave, and the image-side surface 152 is convex.

The sixth lens element 160 comprises an object-side surface 161, an image-side surface 162 and at least one inflection point 163, and has negative refractive power. Accordingly, a telephoto structure is formed by the sixth lens element 160 with the negative refractive power and the fifth lens element 150 with the positive refractive power so the total optical length of the photographing lens assembly 10 is shortened. In addition, the inflection point 163 of the sixth lens element 160 reduces the angle of incidence on the image sensor 182, and, therefore, corrects the off-axis aberrations. When the image-side surface 162 is concave, the principle point of the photographing lens assembly 10 is far from the image plane so the total optical length of the photographing lens assembly 10 is shortened.

The photographing lens assembly 10 satisfies the following conditions:

$0.4 < f/f_1 < 2.5$ (condition 1):

2.5 millimeter (mm) < $TTL$ < 4.5 mm (condition 2):

0.40 mm < $(CT_2 + CT_3 + CT_4)$ < 0.80 mm (condition 3):

Wherein f is the focal length of the photographing lens assembly 10; $f_1$ is the focal length of the first lens element 110; $CT_2$ is the central thickness of the second lens element 120; $CT_3$ is the central thickness of the third lens element 130; $CT_4$ is the central thickness of the fourth lens element 140.

When Condition 1 is satisfied, the positive refractive power is favorable for shortening the total optical length of the photographing lens assembly 10. Besides, the excessive high order spherical aberration is avoided by satisfying Condition 1. Accordingly, the image quality is improved. In some embodiments, the photographing lens assembly 10 satisfies the condition: $0.7 < f/f_1 < 1.8$.

Satisfying Condition 2 is favorable for the miniaturization of the photographing lens assembly 10, so that the photographing lens assembly 10 can be assembled in the lightweight and thin body electronic devices. In some embodiments, the photographing lens assembly 10 satisfies the condition: 2.8 mm < TTL < 3.8 mm.

When the photographing lens element 10 satisfies Condition 3, the central thicknesses of the second lens element 120, the third lens element 130 and the fourth lens element 140 are well distributed. Therefore, the total optical length of the photographing lens assembly 10 is shortened and the image quality is improved.

In this and some embodiments, the photographing lens assembly 10 further satisfies following conditions:

$2.5 < |f/f_5| + |f/f_6| < 6.0$ (condition 4):

$TTL/ImgH < 1.7$ (condition 5):

$72° < FOV < 85°$ (condition 6):

$28 < V_1 - V_2 < 42$ (condition 7):

$0 < |f/f_3| + |f/f_4| < 0.5$ (condition 8):

1.0 mm < $\Sigma CT$ < 2.6 mm (condition 9):

$0.8 < TTL/f < 1.35$ (condition 10):

Wherein f is the focal length of the photographing lens assembly 10; $f_3$ is the focal length of the third lens element 130; $f_4$ is the focal length of the fourth lens element 140; $f_5$ is the focal length of the fifth lens element 150; $f_6$ is the focal length of the sixth lens element 160; $V_1$ is the Abbe number of the first lens element 110; $V_2$ is the Abbe number of the second lens element 120; FOV is the maximal field of view of the photographing optical lens assembly 10; ImgH is half of the diagonal length of the effective photosensitive area of the image sensor 182; TTL is the axial distance between the object-side surface 111 and the image plane 180; $\Sigma CT$ is the sum of the central thicknesses of the first lens element 110, the second lens element 120, the third lens element 130, the fourth lens element 140, the fifth lens element 150 and the sixth lens element 160.

When Condition 4 is satisfied, the refractive power of the fifth lens element 150 and the sixth lens element 160 is favorable to shorten the total optical length of the photographing optical lens assembly 10. Satisfaction of Condition 5 is favorable for the miniaturization of the photographing optical lens assembly 10. When Condition 6 is satisfied, the photographing optical lens assembly 10 has a well-adjusted angle of view. In this and some embodiments, the photographing optical lens assembly 10 satisfies the condition: $74° < FOV < 80°$ Satisfaction of Condition 7 is favorable for the correction of the chromatism of the photographing optical lens assembly 10. When Condition 8 is satisfied, both the third lens element 130 and the fourth lens element 140 have optimal refractive power with desirable corrections of the high order aberration. Satisfaction of Condition 9 is favorable for shortening the total optical length and the miniaturization of the photographing optical lens assembly 10. Satisfaction of Condition 10 is also favorable for shortening the total optical length and the miniaturization of the photographing optical lens assembly 10.

In order to reduce the manufacturing costs, the first lens element 110, the second lens element 120, the third lens element 130, the fourth lens element 140, the fifth lens element 150 and the sixth lens element 160 may be made of plastic. In addition, the surfaces of the first lens element 110, the second lens element 120, the third lens element 130, the fourth lens element 140, the fifth lens element 150 and the sixth lens element 160 may be aspheric. Aspheric profile allows more design-parameter freedom for the aberration correction so the total optical length of the photographing optical lens assembly 10 can be shortened effectively. The aperture stop 100 may be disposed on the optical axis and between the imaged object and the second lens element 120. As the aperture stop 100 gets closer to the imaged object, the angle of incidence on the image plane 180 becomes closer to 90°. Accordingly, a telecentric effect is generated so the photosensitivity of the image sensor 182 is improved and the dark regions generated at the corners of images are reduced. When the aperture stop 100 gets closer to the second lens element 120, the angle of view becomes wider, both the distortion and the chromatic Aberration of magnification are corrected and the sensitivity of the photographing optical lens assembly 10 is reduced.

In addition, in the photographing optical lens assembly 10, a convex surface means the surface at a paraxial site is convex; a concave surface means a surface at a paraxial site is concave.

Furthermore, for eliminating the stray light to improve the image quality or limiting the object image to a desirable size, at least one stop, such as a glare stop or field stop, may be disposed in the photographing optical lens assembly 10.

As for the optical lens assembly 10, the specific schemes are further described with the following embodiments. Parameters in the embodiments are defined as follows. Fno is an f-number value of the photographing optical lens assembly 10, and HFOV is half of maximal field of view in the photographing optical lens assembly 10. The aspheric surface in the embodiments may be represented by, but not limited to, the following aspheric surface equation (Condition ASP):

$$X(Y) = (Y^2/R)/(1 + sqrt(1-(1+k)*(Y/R)^2)) + \sum_i (Ai)*(Y^i)$$

Wherein Y is the distance from the point on the curve of the aspheric surface to the optical axis, X is the height of a point on the aspheric surface at a distance Y from the optical axis relative to the tangential plane at the aspheric surface vertex, k is a conic factor, Ai is an $i^{th}$ order aspheric surface coefficient, and in the embodiments, i may be, but is not limited to, 4, 6, 8, 10, 12, 14 and 16.

The First Embodiment

Embodiment 1

FIG. 1A is a schematic structural view of the first embodiment of the photographing optical lens assembly. The photographing optical lens assembly 10 comprises, from an object side to an image side along an optical axis (from left to right in FIG. 1A) in sequence, the stop, the first lens element 110, the second lens element 120, the third lens element 130, the fourth lens element 140, the fifth lens element 150, the sixth lens element 160, the infrared filter 170 and the image sensor 182 disposed on the image plane 180. In this embodiment, the stop is, for example, the aperture stop 100.

In this embodiment, light having the reference wavelength of 587.6 nm is incident on the photographing optical lens assembly 10. However, the reference wavelength of the light does not intend to limit the disclosure. In some embodiments, light with different wavelength is used based on various demands.

In this embodiment, the refractive power of the first lens element 110 is positive; the refractive power of the second lens element 120 is negative; the refractive power of the fifth lens element 150 is positive; the refractive power of the sixth lens element 160 is negative. Besides, the object-side surface 111 of the first lens element 110 is convex; the object-side surface 141 of the fourth lens element 140 is convex; the object-side surface 151 of the fifth lens element 150 is concave; the image-side surface 152 of the fifth lens element 150 is convex; the image-side surface 162 of the sixth lens element 160 is concave. In order to reduce the angle of incidence on the image sensor 182 disposed on the image plane 180 so as to correct the off-axis aberration, the fourth lens element 140 comprises at least one inflection point 143, and the sixth lens element 160 comprises at least one inflection point 163.

The detailed data of the photographing optical lens assembly 10 is as shown in Table 1-1 below:

TABLE 1-1

Embodiment 1
f = 2.97, Fno = 2.45, HFOV = 37.2 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Ape. Stop | Plano | −0.120 | | | | |
| 2 | Lens 1 | 1.376280 (ASP) | 0.496 | Plastic | 1.544 | 55.9 | 2.67 |
| 3 | | 22.925300 (ASP) | 0.122 | | | | |
| 4 | Lens 2 | −52.516000 (ASP) | 0.200 | Plastic | 1.640 | 23.3 | −3.72 |
| 5 | | 2.494920 (ASP) | 0.107 | | | | |
| 6 | Lens 3 | 2.694370 (ASP) | 0.200 | Plastic | 1.640 | 23.3 | 127.08 |
| 7 | | 2.706010 (ASP) | 0.078 | | | | |
| 8 | Lens 4 | 1.979700 (ASP) | 0.245 | Plastic | 1.544 | 55.9 | 11.33 |
| 9 | | 2.788380 (ASP) | 0.265 | | | | |
| 10 | Lens 5 | −4.510600 (ASP) | 0.517 | Plastic | 1.535 | 56.3 | 1.67 |
| 11 | | −0.775240 (ASP) | 0.046 | | | | |
| 12 | Lens 6 | 16.750200 (ASP) | 0.521 | Plastic | 1.535 | 56.3 | −1.55 |
| 13 | | 0.780520 (ASP) | 0.500 | | | | |
| 14 | IR-cut filter | Plano | 0.200 | Glass | 1.517 | 64.2 | — |
| 15 | | Plano | 0.305 | | | | |
| 16 | Image | Plano | — | | | | |

Note:
Reference wavelength is d-line 587.6 nm, and ASP represents aspheric.

In Table 1-1, from the object-side surface 111 to the image-side surface 162, all the surfaces can be aspheric, and the aspheric surfaces can satisfy Condition ASP, but are not limited thereto. As for the parameters of the aspheric surfaces, reference is made to Table 1-2 below:

TABLE 1-2

Aspheric Coefficients

| Surface # | 2 | 3 | 4 | 5 |
|---|---|---|---|---|
| K | −6.47244E−1 | −2.00000E+00 | −2.00000E+01 | 2.00000E+00 |
| $A_4$ | 1.94523E−02 | −9.64344E−02 | −8.56005E−2 | 1.10816E−02 |
| $A_6$ | −8.79893E−02 | −3.95194E−01 | −2.69281E−01 | −1.63880E−01 |
| $A_8$ | 1.97305E−01 | 1.29192E−01 | −4.72189E−01 | 2.35052E−01 |
| $A_{10}$ | −5.99721E−01 | −2.86778E−02 | 1.71644E+00 | 6.84528E−02 |
| $A_{12}$ | — | — | −7.09346E−01 | −2.26526E−02 |

TABLE 1-2-continued

| Aspheric Coefficients | | | | |
|---|---|---|---|---|
| Surface # | 6 | 7 | 8 | 9 |
| K | 4.80533E−01 | −2.06385E+00 | −1.42180E+00 | −1.04593E+00 |
| $A_4$ | −5.32100E−02 | −1.01733E−01 | −2.03176E−01 | −9.96412E−02 |
| $A_6$ | −1.29643E−01 | −1.94636E−02 | −1.16115E−02 | −1.07564E−01 |
| $A_8$ | 2.79626E−02 | −4.55105E−02 | 3.46698E−02 | −1.86919E−02 |
| $A_{10}$ | 1.76936E−01 | −9.02067E−03 | 5.32974E−03 | 3.13214E−02 |
| $A_{12}$ | −9.52055E−02 | 1.52751E−01 | −1.07578E−02 | 2.65311E−02 |
| Surface # | 10 | 11 | 12 | 13 |
| K | 1.57868E+01 | −3.04631E+00 | −1.00000E+00 | −5.48740E+00 |
| $A_4$ | 9.70017E−02 | −8.33805E−02 | −4.10010E−01 | −2.36448E−01 |
| $A_6$ | −9.90300E−02 | 6.30231E−02 | 4.75726E−01 | 2.27698E−01 |
| $A_8$ | 8.27959E−01 | 3.43915E−01 | −3.56331E−01 | −1.69339E−01 |
| $A_{10}$ | −2.55298E+00 | −3.03342E−01 | 1.81138E−01 | 8.27418E−02 |
| $A_{12}$ | 3.58610E+00 | −6.27815E−02 | −5.80273E−02 | −2.56154E−02 |
| $A_{14}$ | −2.59401E+00 | 1.24340E−01 | 1.06713E−02 | 4.43684E−03 |
| $A_{16}$ | 7.65091E−01 | −3.08456E−02 | −8.54395E−04 | −3.16521E−04 |

In Table 1-1, the curvature radius, the thickness and the focal length are shown in millimeters (mm). Surface numbers 0-16 represent the surfaces sequentially arranged from the object-side to the image-side along the optical axis. "f" stands for the focal length, "Fno" is the f-number, and "HFOV" is half of maximal field of view of this embodiment. In Table 1-2, k represents the conic coefficient of the equation of the aspheric surface profiles. A1-A16 represent the aspheric coefficients ranging from the 1st order to the $16^{th}$ order. All labels for Tables of the remaining embodiments share the same definitions as those in Table 1-1 and Table 1-2 of the first embodiment, and their definitions will not be stated again. The content of Table 1-3 may be deduced from Table 1-1:

TABLE 1-3

| Embodiment 1 | | | |
|---|---|---|---|
| f (mm) | 2.97 | $f/f_1$ | 1.11 |
| Fno | 2.45 | $|f/f_3| + |f/f_4|$ | 0.28 |
| HFOV(deg.) | 37.2 | $|f/f_5| + |f/f_6|$ | 3.69 |
| FOV(deg) | 74.4 | TTL (mm) | 3.73 |
| $V_1 - V_2$ | 32.6 | TTL/f | 1.26 |
| $CT_2 + CT_3 + CT_4$ | 0.65 | TTL/ImgH | 1.66 |
| ΣCT | 2.18 | | |

It can be observed from Table 1-3 that f/f1 equals 1.11 which satisfies Condition 1; TTL equals 3.73 which satisfies Condition 2; $CT_2+CT_3+CT_4$ equals 0.65 which satisfies Condition 3; $|f/f_5|+|f/f_6|$ equals 3.69 which satisfies Condition 4. TTL/ImgH equals 1.66 which satisfies Condition 5; FOV equals 74.4 which satisfies
Condition 6; $V_1-V_2$ equals 32.6 which satisfies Condition 7; $|f/f_3|+|f/f_4|$ equals 0.28 which satisfies Condition 8; ΣCT equals 2.18 which satisfies Condition 9; TTL/f equals 1.26 which satisfies Condition 10.

FIG. 1B is a graph of longitudinal spherical aberration curves when the lights having wavelengths of 486.1 nm, 587.6 nm, and 656.3 nm are respectively projected in the photographing optical lens assembly 10 in FIG. 1A. The longitudinal spherical aberration curve of the light having the wavelength of 486.1 nm in the photographing optical lens assembly 10 is indicated by a solid line L in FIG. 1B. The longitudinal spherical aberration curve of the light having the wavelength of 587.6 nm in the photographing optical lens assembly 10 is indicated by a dashed line M in FIG. 1B. The longitudinal spherical aberration curve of the light having the wavelength of 656.3 nm in the photographing optical lens assembly 10 is indicated by a dotted line N in FIG. 1B. Horizontal axis is the focus position (millimeter, mm), and vertical axis is the normalized entrance pupil or aperture value. In other words, the differences of the focus positions of the paraxial light (the longitudinal coordinate is close to 0) and the fringe light (the longitudinal coordinate is close to 1) on the image plane 180 can be seen from the longitudinal spherical aberration curves. It can be observed from FIG. 1B that for the lights having wavelengths of 486.1 nm, 587.6 nm and 656.3 nm, the corresponding longitudinal spherical aberrations generated by the photographing optical lens assembly 10 are within a range of −0.02 mm to 0.02 mm.

In the second embodiment to the tenth embodiment and the graphs of the longitudinal spherical aberration curves in FIGS. 2B, 3B, 4B, 5B, 6B, 7B, 8B, 9B and 10B, the solid line L indicates the longitudinal spherical aberration curve of the light having the wavelength of 486.1 nm, the dashed line M indicates the longitudinal spherical aberration curve of the light having the wavelength of 587.6 nm, and the dotted line N indicates the longitudinal spherical aberration curve of the light having the wavelength of 656.3 nm, which will not be repeated herein for conciseness.

FIG. 1C is a graph of astigmatic field curves when the light having the wavelength of 587.6 nm is projected in the photographing optical lens assembly 10 in FIG. 1A. An astigmatic field curve of a tangential plane is indicated by a dashed line T in FIG. 1C. An astigmatic field curve of a sagittal plane is indicated by a solid line S in FIG. 1C. Horizontal axis is the focus position (mm), and vertical axis is the image height (mm). That is, the differences in focus positions of the tangential plane and the sagittal plane due to curvatures can be observed in the astigmatic field curves. It can be observed from FIG. 1C that the astigmatic field curvature of the tangential plane is within a range of −0.025 mm to 0.025 mm, and the astigmatic field curvature of the sagittal plane is within a range of −0.025 mm to 0 mm.

In the second embodiment to the tenth embodiment and the graphs of the astigmatic field curves in FIGS. 2C, 3C, 4C, 5C, 6C, 7C, 8C, 9C and 10C, the solid line S indicates the astigmatic field curve of the sagittal plane, and the dashed line T indicates the astigmatic field curve of the tangential plane, which will not be repeated herein for conciseness.

FIG. 1D is a graph of a distortion curve when the light having the wavelength of 587.6 nm is projected in the photographing optical lens assembly 10 in FIG. 1A. The horizontal axis is the distortion ratio (%), and the vertical axis is the image height (mm). That is, the differences in the distortion ratio due to various image heights can be observed in the distortion curve G. It can be observed from FIG. 1D that the distortion ratio corresponding to the light having wavelength of 587.6 nm is within a range of −2.0% to 1.5%. As shown in FIGS. 1B to 1D, the photographing optical lens assembly 10, designed according to the first embodiment, is capable of effectively correcting various aberrations.

In the second embodiment to the tenth embodiment and the graph of the distortion curves in FIGS. 2D, 3D, 4D, 5D, 6D, 7D, 8D, 9D and 10D, the solid line G indicates the distortion curve of the light having the wavelength of 587.6 nm, which will not be repeated herein for conciseness.

It should be noted that the distortion curves and the astigmatic field curves of the wavelength of 486.1 nm and 656.3 nm are highly similar to the distortion curve and the astigmatic field curves of the wavelength of 587.6 nm. In order to prevent the confusion of reading the curves in FIGS. 1C and 1D, the distortion curve and the astigmatic field curves of wavelengths of 486.1 nm and 656.3 nm are not shown in FIGS. 1C and 1D, and the same applies throughout the rest of the embodiments of this present disclosure.

The Second Embodiment

Embodiment 2

Figure 2A:
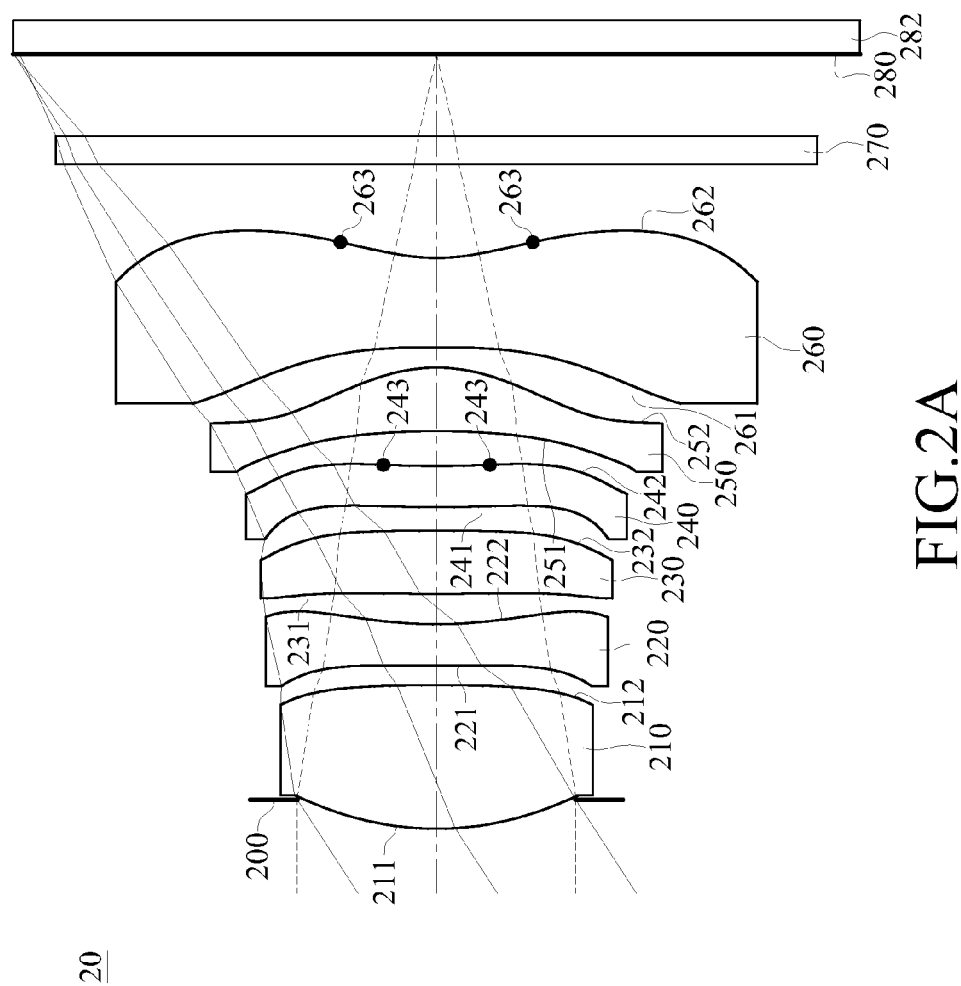
FIG. 2A is a schematic structural view of a second embodiment of a photographing optical lens assembly.

FIG. 2A is a schematic structural view of the second embodiment of the photographing optical lens assembly. The specific implementation and elements of the second embodiment are substantially the same as those in the first embodiment. The element symbols in the second embodiment all begin with "2" which correspond to those in the first embodiment with the same function or structure. For conciseness, only the differences are illustrated below, and the similarities will not be repeated herein.

In this embodiment, for example, the reference wavelength of the light received by the photographing optical lens assembly 20 is 587.6 nm, but this reference wavelength may be adjusted according to actual requirements, and is not limited to the wavelength value mentioned above.

In this embodiment, a first lens element 210 with positive refractive power comprises a convex object-side surface 211. A second lens element 220 has negative refractive power. A fourth lens element 240 with at least one inflection point 243 comprises a convex object-side surface 241. A fifth lens element 250 with positive refractive power comprises concave object-side surface 251 and a convex image-side surface 252. A sixth lens element 260 with negative refractive power comprises a concave image-side surface 262 and at least one inflection point 263.

The detailed data of the photographing optical lens assembly 20 is as shown in Table 2-1 below:

TABLE 2-1

Embodiment 2
f = 3.41, Fno = 2.30, HFOV = 33.0 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Ape. Stop | Plano | −0.155 | | | | |
| 2 | Lens 1 | 1.612420 (ASP) | 0.766 | Plastic | 1.544 | 55.9 | 2.57 |
| 3 | | −8.780100 (ASP) | 0.105 | | | | |
| 4 | Lens 2 | 63.912500 (ASP) | 0.220 | Plastic | 1.634 | 23.8 | −4.02 |
| 5 | | 2.450570 (ASP) | 0.161 | | | | |
| 6 | Lens 3 | 16.781500 (ASP) | 0.337 | Plastic | 1.544 | 55.9 | 17.73 |
| 7 | | −22.531100 (ASP) | 0.125 | | | | |
| 8 | Lens 4 | 5.703800 (ASP) | 0.220 | Plastic | 1.634 | 23.8 | −101.45 |
| 9 | | 5.160800 (ASP) | 0.186 | | | | |
| 10 | Lens 5 | −4.070600 (ASP) | 0.339 | Plastic | 1.544 | 55.9 | 1.88 |
| 11 | | −0.841530 (ASP) | 0.108 | | | | |
| 12 | Lens 6 | −6.773000 (ASP) | 0.476 | Plastic | 1.544 | 55.9 | −1.58 |
| 13 | | 1.009170 (ASP) | 0.500 | | | | |
| 14 | IR-cut filter | Plano | 0.150 | Glass | 1.517 | 64.2 | — |
| 15 | | Plano | 0.436 | | | | |
| 16 | Image | Plano | — | | | | |

Note:
Reference wavelength is d-line 587.6 nm, and ASP represents aspheric.

In Table 2-1, from the object-side surface 211 to the image-side surface 262, all the surfaces can be aspheric, and the aspheric surfaces can satisfy Condition ASP, but are not limited thereto. As for the parameters of the aspheric surfaces, reference is made to Table 2-2 below.

TABLE 2-2

Aspheric Coefficients

| Surface# | 2 | 3 | 4 |
|---|---|---|---|
| K | −8.58356E−01 | 3.00000E+00 | −1.00000E+00 |
| $A_4$ | 1.61679E−02 | −6.91715E−03 | −8.35658E−02 |
| $A_6$ | −2.25732E−02 | −2.61609E−01 | −2.82568E−01 |
| $A_8$ | 3.40280E−02 | 2.01206E−01 | −4.21425E−02 |
| $A_{10}$ | −6.98368E−02 | −2.32357E−01 | 2.79007E−01 |
| $A_{12}$ | −8.45067E−03 | 1.25470E−01 | −1.89448E−01 |

| Surface# | 5 | 6 | 7 |
|---|---|---|---|
| K | −2.24698E+00 | −1.00000E+00 | −1.00000E+00 |
| $A_4$ | −4.19723E−02 | −4.81716E−02 | −1.18773E−01 |
| $A_6$ | −2.11052E−01 | −8.65909E−02 | −1.09568E−01 |
| $A_8$ | 1.21211E−01 | −2.67128E−02 | −2.79569E−02 |
| $A_{10}$ | −1.08261E−1 | 1.11821E−01 | 2.93357E−02 |
| $A_{12}$ | 2.99563E−02 | 1.14429E−02 | 6.30736E−02 |

| Surface# | 8 | 9 | 10 |
|---|---|---|---|
| K | −1.00000E+00 | −1.00000E+00 | 1.24134E+01 |
| $A_4$ | −2.07856E−01 | −2.21888E−01 | 1.88259E−02 |
| $A_6$ | −7.11268E−02 | −4.80489E−02 | −2.33671E−02 |

TABLE 2-2-continued

Aspheric Coefficients

| | | | |
|---|---|---|---|
| $A_8$ | 8.28507E−02 | −7.44657E−02 | 8.65893E−01 |
| $A_{10}$ | −1.81601E−01 | 4.39705E−02 | −2.44261E+00 |
| $A_{12}$ | −6.74448E−02 | 5.98533E−02 | 3.68679E+00 |
| $A_{14}$ | | | −2.56837E+00 |
| $A_{16}$ | | | 6.65168E−01 |

| Surface# | 11 | 12 | 13 |
|---|---|---|---|
| K | −3.39754E+00 | −2.00000E+01 | −8.25726E+00 |
| $A_4$ | −3.75829E−02 | −3.29417E−01 | −2.22013E−01 |
| $A_6$ | 4.21505E−02 | 4.22020E−01 | 2.17323E−01 |
| $A_8$ | 3.55954E−01 | −3.55005E−01 | −1.67874E−01 |
| $A_{10}$ | −2.93814E−01 | 1.87725E−01 | 8.34892E−02 |
| $A_{12}$ | −6.14279E−02 | −5.55109E−02 | −2.56546E−02 |
| $A_{14}$ | 1.23319E−01 | 1.06182E−02 | 4.34520E−03 |
| $A_{16}$ | −3.21256E−02 | −1.57174E−03 | −3.10115E−04 |

The content of Table 2-3 may be deduced from Table 2-1.

TABLE 2-3

Embodiment 2

| | | | |
|---|---|---|---|
| f (mm) | 3.41 | $f/f_1$ | 1.33 |
| Fno | 2.30 | $|f/f_3| + |f/f_4|$ | 0.23 |
| HFOV(deg.) | 33.0 | $|f/f_5| + |f/f_6|$ | 3.97 |
| FOV(deg) | 66.0 | TTL (mm) | 4.08 |
| $V_1 - V_2$ | 32.1 | TTL/f | 1.20 |
| $CT_2 + CT_3 + CT_4$ | 0.78 | TTL/ImgH | 1.81 |
| $\Sigma CT$ | 2.36 | | |

FIG. 2B is a graph of longitudinal spherical aberration curves when the lights having wavelengths of 486.1 nm, 587.6 nm, and 656.3 nm are projected in the photographing optical lens assembly 20 in FIG. 2A. It can be observed from FIG. 2B that for the lights of the wavelengths of 486.1 nm, 587.6 nm, and 656.3 nm, the corresponding longitudinal spherical aberrations generated by the photographing optical lens assembly 20 are within a range of −0.02 mm to 0.01 mm.

FIG. 2C is a graph of astigmatic field curves when light having wavelength of 587.6 nm is projected in the photographing optical lens assembly 20 in FIG. 2A. It can be observed from FIG. 2C that the astigmatic field curvature of the tangential plane is within a range of −0.02 mm to 0.01 mm, and the astigmatic field curvature of the sagittal plane is within a range of −0.02 mm to 0 mm.

FIG. 2D is a graph of a distortion curve when light having wavelength of 587.6 is projected in the photographing optical lens assembly 20 in FIG. 2A. It can be observed from FIG. 2D that the distortion ratio is within a range of 0% to 2.5%. As shown in FIGS. 2B to 2D, the photographing optical lens assembly 20, designed according to the second embodiment, is capable of effectively correcting various aberrations.

The Third Embodiment

Embodiment 3

Figure 3A:
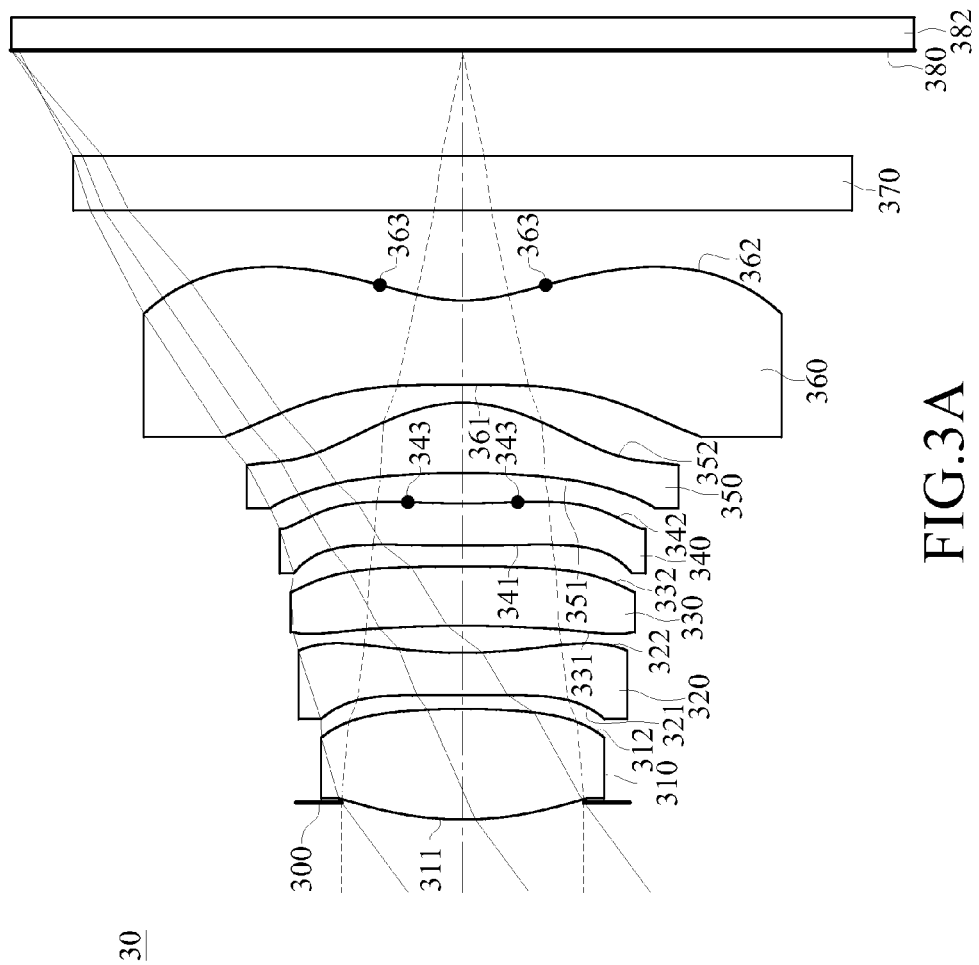
FIG. 3A is a schematic structural view of a third embodiment of an photographing optical lens assembly.

FIG. 3A is a schematic structural view of the third embodiment of the photographing optical lens assembly. The specific implementation and elements of the third embodiment are substantially the same as those in the first embodiment. The element symbols in the third embodiment all begin with "3" which correspond to those in the first embodiment with the same function or structure. For conciseness, only the differences are illustrated below, and the similarities will not be repeated herein.

In this embodiment, for example, the reference wavelength of the light received by the photographing optical lens assembly 30 is 587.6 nm, but the reference wavelength may be adjusted according to actual requirements, and is not limited to the wavelength value mentioned above.

In this embodiment, a first lens element 310 with positive refractive power comprises a convex object-side surface 311. A second lens element 320 has negative refractive power. A fourth lens element 340 with at least one inflection point 343 comprises a convex object-side surface 341. A fifth lens element 350 with positive refractive power comprises a concave object-side surface 351 and a convex image-side surface 352. A sixth lens element 360 with negative refractive power comprises concave image-side surface 362 and at least one inflection point 363.

The detailed data of the photographing optical lens assembly 30 is as shown in Table 3-1 below.

TABLE 3-1

Embodiment 3
f = 3.36 mm, Fno = 2.5, HFOV = 36.5 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Ape. Stop | Plano | −0.09 | | | | |
| 2 | Lens 1 | 1.862420 (ASP) | 0.613 | Plastic | 1.544 | 55.9 | 2.53 |
| 3 | | −4.695400 (ASP) | 0.077 | | | | |
| 4 | Lens 2 | 107.409500 | 0.235 | Plastic | 1.634 | 23.8 | −4.55 |
| 5 | | 2.808900 (ASP) | 0.148 | | | | |
| 6 | Lens 3 | −9.209000 (ASP) | 0.330 | Plastic | 1.544 | 55.9 | −52.88 |
| 7 | | −13.714900 (ASP) | 0.115 | | | | |
| 8 | Lens 4 | 7.815700 (ASP) | 0.235 | Plastic | 1.544 | 55.9 | −40.82 |
| 9 | | 5.720000 (ASP) | 0.169 | | | | |
| 10 | Lens 5 | −4.899400 (ASP) | 0.389 | Plastic | 1.544 | 55.9 | 1.65 |
| 11 | | −0.779250 (ASP) | 0.099 | | | | |
| 12 | Lens 6 | −170.722000 | 0.467 | Plastic | 1.530 | 55.8 | −1.59 |
| 13 | | 0.849270 | 0.500 | | | | |

TABLE 3-1-continued

Embodiment 3
f = 3.36 mm, Fno = 2.5, HFOV = 36.5 deg.

| Surface # | | Curvature radius (mm) | Thickness (mm) | Material | Index | Abbe # | Focal length (mm) |
|---|---|---|---|---|---|---|---|
| 14 | IR-cut filter | Plano | 0.300 | Glass | 1.517 | 64.2 | — |
| 15 | | Plano | 0.587 | | | | |
| 16 | Image | Plano | — | | | | |

Note:
Reference wavelength is d-line 587.6 nm, and ASP represents aspheric.

In Table 3-1, from the object-side surface 311 to the image-side surface 362, all surfaces can be aspheric, and the aspheric surfaces can satisfy Condition ASP, but are not limited thereto. As for the parameters of the aspheric surfaces, reference is made to Table 3-2 below.

TABLE 3-2

Aspheric Coefficients

| Surface# | 2 | 3 | 4 |
|---|---|---|---|
| K | −1.21551E+00 | 1.20839E+00 | −1.00000E+00 |
| $A_4$ | 5.52296E−03 | −5.05493E−02 | −1.16155E−01 |
| $A_6$ | −8.32592E−02 | −3.76059E−01 | −3.90162E−01 |
| $A_8$ | 1.59944E−01 | 2.16474E−01 | −1.30621E−01 |
| $A_{10}$ | −3.49912E−01 | −2.52349E−01 | 2.80938E−01 |
| $A_{12}$ | −8.63381E−02 | 8.29004E−02 | −1.23861E−01 |

| Surface# | 5 | 6 | 7 |
|---|---|---|---|
| K | −2.65220E+00 | −1.00000E+00 | −1.00000E+00 |
| $A_4$ | −4.42843E−02 | −2.63666E−02 | −5.15704E−02 |
| $A_6$ | −1.98292E−01 | −4.98178E−02 | −1.11999E−01 |
| $A_8$ | 4.08081E−02 | 4.86535E−02 | −4.16456E−02 |
| $A_{10}$ | −6.14932E−02 | 7.75483E−02 | 3.30759E−03 |
| $A_{12}$ | 5.39073E−02 | −4.25002E−03 | 7.30652E−02 |

| Surface# | 8 | 9 | 10 |
|---|---|---|---|
| K | −1.00000E+00 | −1.00000E+00 | 1.83417E+01 |
| $A_4$ | −1.63690E−01 | −2.06562E−01 | 4.43442E−02 |
| $A_6$ | −1.83122E−02 | −8.98626E−02 | −2.41806E−01 |
| $A_8$ | 3.23469E−02 | −8.44840E−02 | 8.48751E−01 |
| $A_{10}$ | −2.15157E−01 | 6.65211E−02 | −2.46022E+00 |
| $A_{12}$ | 4.63082E−02 | 8.52761E−02 | 3.68492E+00 |
| $A_{14}$ | | | −2.56186E+00 |
| $A_{16}$ | | | 6.69751E−01 |

| Surface# | 11 | 12 | 13 |
|---|---|---|---|
| K | −3.17483E+00 | 3.00000E+00 | −6.50584E+00 |
| $A_4$ | −5.99222E−02 | −3.52622E−01 | −2.29451E−01 |
| $A_6$ | 4.64160E−02 | 4.12293E−01 | 2.23037E−01 |
| $A_8$ | 3.60941E−01 | −3.53899E−01 | −1.69827E−01 |
| $A_{10}$ | −2.91794E−01 | 1.89194E−01 | 8.37263E−02 |
| $A_{12}$ | −6.13306E−02 | −5.47581E−02 | −2.55273E−02 |
| $A_{14}$ | 1.22712E−01 | 1.05853E−02 | 4.32667E−03 |
| $A_{16}$ | −3.26883E−02 | −1.82242E−03 | −3.11165E−04 |

The content of Table 3-3 may be deduced from Table 3-1.

TABLE 3-3

Embodiment 3

| f (mm) | 3.36 | $f/f_1$ | 1.32 |
|---|---|---|---|
| Fno | 2.50 | $|f/f_3| + |f/f_4|$ | 0.15 |
| HFOV(deg.) | 36.5 | $|f/f_5| + |f/f_6|$ | 4.14 |
| FOV(deg) | 73.0 | TTL (mm) | 4.16 |
| $V_1 - V_2$ | 32.1 | TTL/f | 1.24 |
| $CT_2 + CT_3 + CT_4$ | 0.80 | TTL/ImgH | 1.67 |
| ΣCT | 2.27 | | |

FIG. 3B is a graph of longitudinal spherical aberration curves when the lights having wavelengths of 486.1 nm, 587.6 nm, and 656.3 nm are projected in the photographing optical lens assembly 30 in FIG. 3A. It can be observed from FIG. 3B that for the lights of the wavelengths of 486.1 nm, 587.6 nm, and 656.3 nm, the corresponding longitudinal spherical aberrations generated by the photographing optical lens assembly 30 are within a range of −0.025 mm to 0.01 mm.

FIG. 3C is a graph of astigmatic field curves when light having wavelength of 587.6 nm is projected in the photographing optical lens assembly 30 in FIG. 3A. It can be observed from FIG. 3C that the astigmatic field curvature of the tangential plane is within a range of −0.02 mm to 0.025 mm, and the astigmatic field curvature of the sagittal plane is within a range of −0.025 mm to 0 mm.

FIG. 3D is a graph of a distortion curve when light having wavelength of 587.6 is projected in the photographing optical lens assembly 30 in FIG. 3A. It can be observed from FIG. 3D that the distortion ratio is within a range of −0.5% to 1.5%. As shown in FIGS. 3B to 3D, the photographing optical lens assembly 30, designed according to the third embodiment, is capable of effectively correcting various aberrations.

The Fourth Embodiment

Embodiment 4

Figure 4A:
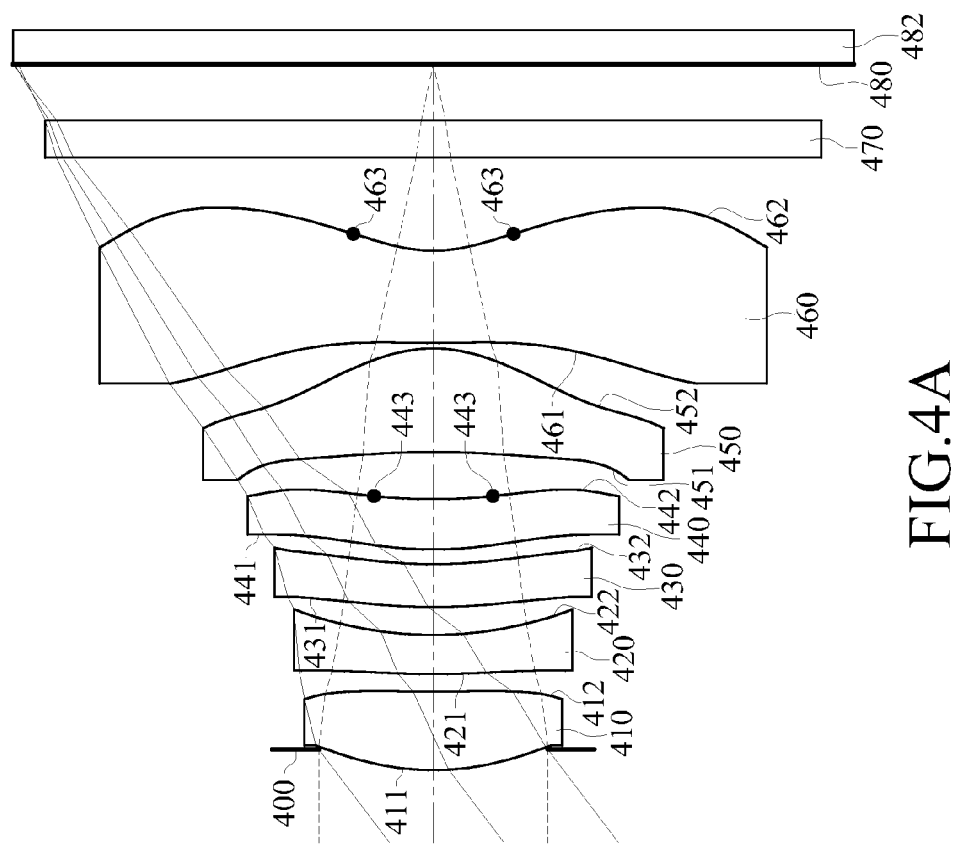
FIG. 4A is a schematic structural view of a fourth embodiment of a photographing optical lens assembly.

FIG. 4A is a schematic structural view of the fourth embodiment of the photographing optical lens assembly. The specific implementation and elements of the fourth embodiment are substantially the same as those in the first embodiment. The element symbols in the fourth embodiment all begin with "4" which correspond to those in the first embodiment with the same function or structure. For conciseness, only the differences are illustrated below, and the similarities will not be repeated herein.

In this embodiment, for example, the reference wavelength of the light received by the photographing optical lens assembly 40 is 587.6 nm, but the reference wavelength may be adjusted according to actual requirements, and is not limited to the wavelength value mentioned above.

In this embodiment, a first lens element 410 with positive refractive power comprises a convex object-side surface 411. A second lens element 420 has negative refractive power. A fourth lens element 440 with at least one inflection point 443 comprises a convex object-side surface 441. A fifth lens element 450 with positive refractive power comprises a concave object-side surface 451 and a convex image-side surface 452. A sixth lens element 460 with negative refractive power comprises concave image-side surface 462 and at least one inflection point 463.

The detailed data of the photographing optical lens assembly 40 is as shown in Table 4-1 below.

TABLE 4-1

Embodiment 4
f = 2.95 mm, Fno = 2.40, HFOV = 37.2 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Ape. | Plano | −0.110 | | | | |
| 2 | Lens 1 | 1.834910 (ASP) | 0.422 | Plastic | 1.544 | 55.9 | 2.84 |
| 3 | | −23.488200 (ASP) | 0.094 | | | | |
| 4 | Lens 2 | 1.432350 (ASP) | 0.210 | Plastic | 1.650 | 21.4 | −5.30 |
| 5 | | 17.605500 (ASP) | 0.150 | | | | |
| 6 | Lens 3 | 5.311000 (ASP) | 0.230 | Plastic | 1.607 | 26.6 | −21.01 |
| 7 | | 2.056390 (ASP) | 0.079 | | | | |
| 8 | Lens 4 | 3.244900 (ASP) | 0.270 | Plastic | 1.544 | 55.9 | 10.53 |
| 9 | | 2.517650 (ASP) | 0.254 | | | | |
| 10 | Lens 5 | 1.922960 (ASP) | 0.556 | Plastic | 1.535 | 56.3 | 1.62 |
| 11 | | 2.751070 (ASP) | 0.030 | | | | |
| 12 | Lens 6 | −4.548400 (ASP) | 0.495 | Plastic | 1.535 | 56.3 | −1.51 |
| 13 | | −0.759230 (ASP) | 0.500 | | | | |
| 14 | IR-cut filter | Plano | 0.200 | Glass | 1.517 | 64.2 | — |
| 15 | | Plano | 0.303 | | | | |
| 16 | Image | Plano | — | | | | |

Note:
Reference wavelength is d-line 587.6 nm, and ASP represents aspheric.

In Table 4-1, from the object-side surface 411 to the image-side surface 462, all surfaces can be aspheric, and the aspheric surfaces can satisfy Condition ASP, but are not limited thereto. As for the parameters of the aspheric surfaces, reference is made to Table 4-2 below.

TABLE 4-2

| Aspheric Coefficients | | | |
|---|---|---|---|
| Surface# | 2 | 3 | 4 |
| K | −8.67521E−01 | −1.37638E−01 | 2.00000E+00 |
| $A_4$ | 8.11774E−03 | −9.43753E−02 | −6.19233E−02 |
| $A_6$ | −1.00814E−01 | −3.55893E−01 | −1.88836E−01 |
| $A_8$ | 1.21382E−01 | 1.02391E−01 | −4.48663E−01 |
| $A_{10}$ | −5.96430E−01 | −1.41844E−02 | 1.58327E+00 |
| $A_{12}$ | — | — | −7.09346E−01 |
| Surface# | 5 | 6 | 7 |
| K | 1.28121E+00 | 2.09520E−01 | −5.16999E+00 |
| $A_4$ | 4.22069E−03 | −5.59187E−02 | −1.07826E−01 |
| $A_6$ | −1.96725E−01 | −1.51376E−01 | 2.50520E−03 |
| $A_8$ | 2.18611E−01 | 2.31235E−02 | −3.97576E−02 |
| $A_{10}$ | 5.44619E−02 | 2.11725E−01 | −1.69409E−02 |
| $A_{12}$ | −2.26532E−02 | −9.52061E−02 | 1.94829E−01 |
| Surface# | 8 | 9 | 10 |
| K | −2.19118E+00 | −1.54766E+00 | 1.58512E+01 |
| $A_4$ | −2.11756E−01 | −1.02672E−01 | 1.11101E−01 |
| $A_6$ | −1.07220E−02 | −1.04856E−01 | −1.14819E−01 |
| $A_8$ | 4.47551E−02 | −1.82067E−02 | 8.38106E−01 |
| $A_{10}$ | 1.93293E−02 | 3.30165E−02 | −2.54721E+00 |
| $A_{12}$ | 3.66611E−03 | 2.91086E−02 | 3.58758E+00 |
| $A_{14}$ | | | −2.59491E+00 |
| $A_{16}$ | | | 7.59892E−01 |
| Surface# | 11 | 12 | 13 |
| K | −3.41434E+00 | −1.00000E+00 | −5.45278E+00 |
| $A_4$ | −8.52973E−02 | −4.14201E−01 | −2.32519E−01 |
| $A_6$ | 6.71918E−02 | 4.75001E−01 | 2.26509E−01 |
| $A_8$ | 3.45090E−01 | −3.56194E−01 | −1.69096E−01 |
| $A_{10}$ | −3.01594E−01 | 1.81282E−01 | 8.28284E−02 |

TABLE 4-2-continued

| Aspheric Coefficients | | | |
|---|---|---|---|
| $A_{12}$ | −6.20376E−02 | −5.80276E−02 | −2.56238E−02 |
| $A_{14}$ | 1.24491E−01 | 1.06635E−02 | 4.42937E−03 |
| $A_{16}$ | −3.12531E−02 | −8.74046E−04 | −3.17428E−04 |

The content of Table 4-3 may be deduced from Table 4-1.

TABLE 4-3

| Embodiment 4 | | | |
|---|---|---|---|
| f (mm) | 2.95 | $f/f_1$ | 1.04 |
| Fno | 2.40 | $|f/f_3| + |f/f_4|$ | 0.42 |
| HFOV(deg.) | 37.2 | $|f/f_5| + |f/f_6|$ | 3.77 |
| FOV(deg) | 74.4 | TTL (mm) | 3.73 |
| $V_1 - V_2$ | 34.5 | TTL/f | 1.26 |
| $CT_2 + CT_3 + CT_4$ | 0.71 | TTL/ImgH | 1.66 |
| ΣCT | 2.18 | | |

FIG. 4B is a graph of longitudinal spherical aberration curves when the lights having wavelengths of 486.1 nm, 587.6 nm, and 656.3 nm are projected in the photographing optical lens assembly 40 in FIG. 4A. It can be observed from FIG. 4B that for the lights of the wavelengths of 486.1 nm, 587.6 nm, and 656.3 nm, the corresponding longitudinal spherical aberrations generated by the photographing optical lens assembly 40 are within a range of −0.01 mm to 0.015 mm.

FIG. 4C is a graph of astigmatic field curves when light having wavelength of 587.6 nm is projected in the photographing optical lens assembly 40 in FIG. 4A. It can be observed from FIG. 4C that the astigmatic field curvature of the tangential plane is within a range of −0.015 mm to 0.03 mm, and the astigmatic field curvature of the sagittal plane is within a range of −0.02 mm to 0 mm.

FIG. 4D is a graph of a distortion curve when light having wavelength of 587.6 is projected in the photographing optical lens assembly 40 in FIG. 4A. It can be observed from FIG. 4D that the distortion ratio is within a range of −0.5% to 1.5%. As shown in FIGS. 4B to 4D, the photographing optical lens assembly 40, designed according to the fourth embodiment, is capable of effectively correcting various aberrations.

The Fifth Embodiment

Embodiment 5

Figure 5A:
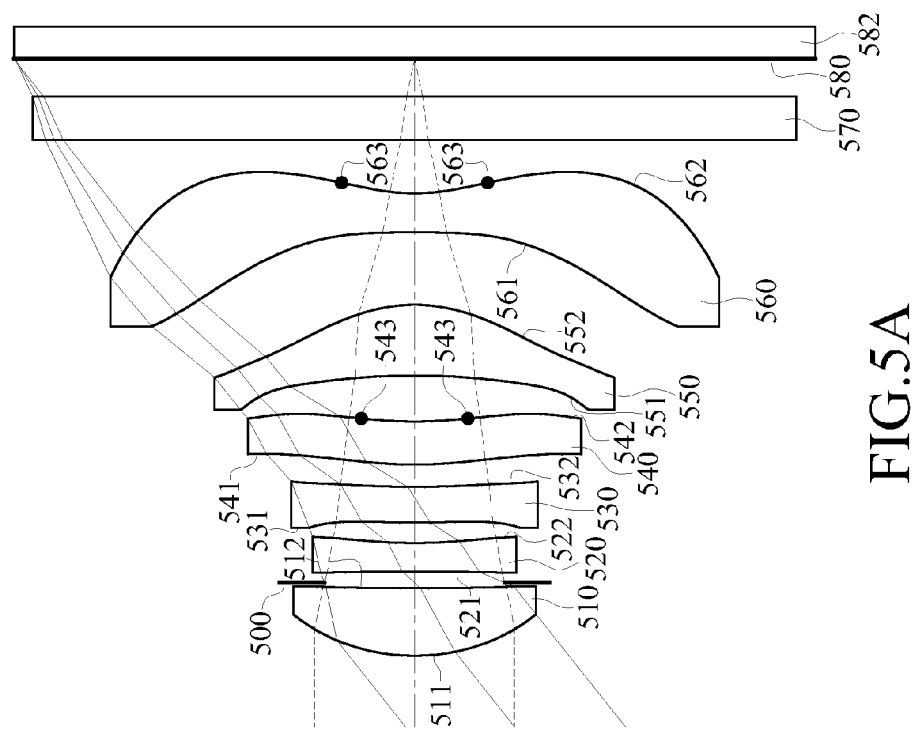
FIG. 5A is a schematic structural view of a fifth embodiment of a photographing optical lens assembly.

FIG. 5A is a schematic structural view of the fifth embodiment of the photographing optical lens assembly. The specific implementation and elements of the fifth embodiment are substantially the same as those in the first embodiment. The element symbols in the fifth embodiment all begin with "5" which correspond to those in the first embodiment with the same function or structure. For conciseness, only the differences are illustrated below, and the similarities will not be repeated herein.

In this embodiment, for example, the reference wavelength of the light received by the photographing optical lens assembly 50 is 587.6 nm, but the reference wavelength may be adjusted according to actual requirements, and is not limited to the wavelength value mentioned above.

In this embodiment, a first lens element 510 with positive refractive power comprises a convex object-side surface 511. A second lens element 520 has negative refractive power. A fourth lens element 540 with at least one inflection point 543 comprises a convex object-side surface 541. A fifth lens element 550 with positive refractive power comprises a concave object-side surface 551 and a convex image-side surface 552. A sixth lens element 560 with negative refractive power comprises concave image-side surface 562 and at least one inflection point 563. In addition, a stop is disposed between the first lens element 510 and the second lens element 520. In this embodiment, the stop is, for example, an aperture stop 500.

The detailed data of the photographing optical lens assembly 50 is as shown in Table 5-1 below.

In Table 5-1, from the object-side surface 511 to image-side surface 562, all the surfaces can be aspheric, and the aspheric surfaces can satisfy Condition ASP, but are not limited thereto. As for the parameters of the aspheric surfaces, reference is made to Table 5-2 below.

TABLE 5-2

Aspheric Coefficients

| Surface# | 1 | 2 | 4 |
|---|---|---|---|
| K | −3.36585E−01 | 5.00000E+01 | −9.00000E+01 |
| $A_4$ | 5.53275E−02 | 8.40710E−02 | −3.98789E−02 |
| $A_6$ | 3.91262E−02 | −4.32736E−02 | 1.14342E−01 |
| $A_8$ | 1.16589E−01 | — | — |
| $A_{10}$ | −8.28268E−02 | — | — |
| $A_{12}$ | 5.59485E−02 | — | — |

| Surface# | 5 | 6 | 7 |
|---|---|---|---|
| K | −1.96340E+01 | −1.92430E+01 | 2.67017E+01 |
| $A_4$ | −1.14609E−01 | −2.55480E−01 | −1.31750E−01 |
| $A_6$ | −3.04905E−01 | −8.20603E−01 | −1.57994E−01 |
| $A_8$ | 8.04500E−01 | 1.14852E−01 | 2.90548E−01 |
| $A_{10}$ | −1.43092E+00 | 6.27369E−01 | −4.65602E−02 |
| $A_{12}$ | 1.92054E+00 | 1.93710E+00 | 5.01530E−01 |

| Surface# | 8 | 9 | 10 |
|---|---|---|---|
| K | −2.67300E+01 | −3.05808E+01 | 1.64379E+01 |
| $A_4$ | −1.34437E−01 | −8.59517E−02 | −4.22530E−02 |
| $A_6$ | 1.27112E−02 | −1.14710E−01 | 5.34446E−02 |
| $A_8$ | 2.29231E−01 | 1.66138E−02 | 1.42779E+00 |
| $A_{10}$ | −3.96140E−02 | 6.90377E−02 | −5.46141E+00 |
| $A_{12}$ | −2.59617E−01 | 5.32411E−03 | 8.97901E+00 |
| $A_{14}$ | | | −7.67133E+00 |
| $A_{16}$ | | | 2.70936E+00 |

| Surface# | 11 | 12 | 13 |
|---|---|---|---|
| K | −3.17626E+00 | 1.00000E+00 | −7.40248E+00 |
| $A_4$ | −1.72389E−01 | −5.70447E−01 | −3.08712E−01 |

TABLE 5-1

Embodiment 5
f = 2.75 mm, Fno = 2.45, HFOV = 38 deg.

| Surface # | | Curvature Radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 1.155060 (ASP) | 0.380 | Plastic | 1.544 | 55.9 | 2.16 |
| 2 | | 57.469500 (ASP) | 0.030 | | | | |
| 3 | Ape. Stop | Plano | 0.063 | | | | |
| 4 | Lens 2 | −21.810700 (ASP) | 0.160 | Plastic | 1.650 | 21.4 | −3.68 |
| 5 | | 2.690650 (ASP) | 0.115 | | | | |
| 6 | Lens 3 | 5.863000 (ASP) | 0.200 | Plastic | 1.583 | 30.2 | −55.21 |
| 7 | | 4.897800 (ASP) | 0.125 | | | | |
| 8 | Lens 4 | 2.114280 (ASP) | 0.242 | Plastic | 1.544 | 55.9 | 39.58 |
| 9 | | 2.249860 (ASP) | 0.258 | | | | |
| 10 | Lens 5 | −4.231200 (ASP) | 0.397 | Plastic | 1.544 | 55.9 | 2.01 |
| 11 | | −0.898380 (ASP) | 0.406 | | | | |
| 12 | Lens 6 | −17.168200 (ASP) | 0.220 | Plastic | 1.544 | 55.9 | −1.79 |
| 13 | | 1.035390 (ASP) | 0.300 | | | | |
| 14 | IR-cut filter | Plano | 0.242 | Glass | 1.517 | 64.2 | — |
| 15 | | Plano | 0.213 | | | | |
| 16 | Image | Plano | — | | | | |

Note:
Reference wavelength is d-line 587.6 nm, ASP represents aspheric.

TABLE 5-2-continued

| Aspheric Coefficients | | | |
|---|---|---|---|
| $A_6$ | 7.38812E−02 | 7.24075E−01 | 3.33439E−01 |
| $A_8$ | 6.45160E−01 | −6.36290E−01 | −3.04526E−01 |
| $A_{10}$ | −6.30090E−01 | 3.84191E−01 | 1.78415E−01 |
| $A_{12}$ | −1.56643E−01 | −1.46010E−01 | −6.46376E−02 |
| $A_{14}$ | 3.67541E−01 | 3.14902E−02 | 1.29462E−02 |
| $A_{16}$ | −1.07363E−01 | −2.93293E−03 | −1.09379E−03 |

The content of Table 5-3 may be deduced from Table 5-1.

TABLE 5-3

Embodiment 5

| f (mm) | 2.75 | $f/f_1$ | 1.27 |
|---|---|---|---|
| Fno | 2.45 | $|f/f_3| + |f/f_4|$ | 0.12 |
| HFOV(deg.) | 38.4 | $|f/f_5| + |f/f_6|$ | 2.90 |
| FOV(deg) | 76.8 | TTL (mm) | 3.27 |
| $V_1 − V_2$ | 34.5 | TTL/f | 1.19 |
| $CT_2 + CT_3 + CT_4$ | 0.60 | TTL/ImgH | 1.46 |
| ΣCT | 1.60 | | |

FIG. 5B is a graph of longitudinal spherical aberration curves when the lights having wavelengths of 486.1 nm, 587.6 nm, and 656.3 nm are projected in the photographing optical lens assembly 50 in FIG. 5A. It can be observed from FIG. 5B that for the lights of the wavelengths of 486.1 nm, 587.6 nm, and 656.3 nm, the corresponding longitudinal spherical aberrations generated by the photographing optical lens assembly 50 are within a range of −0.015 mm to 0.01 mm.

FIG. 5C is a graph of astigmatic field curves when light having wavelength of 587.6 nm is projected in the photographing optical lens assembly 50 in FIG. 5A. It can be observed from FIG. 5C that the astigmatic field curvature of the tangential plane is within a range of −0.025 mm to 0.02 mm, and the astigmatic field curvature of the sagittal plane is within a range of −0.025 mm to 0.01 mm.

FIG. 5D is a graph of a distortion curve when light having wavelength of 587.6 is projected in the photographing optical lens assembly 50 in FIG. 5A. It can be observed from FIG. 5D that the distortion ratio is within a range of 0% to 3.5%. As shown in FIGS. 5B to 5D, the photographing optical lens assembly 50, designed according to the fifth embodiment, is capable of effectively correcting various aberrations.

The Sixth Embodiment

Embodiment 6

Figure 6A:
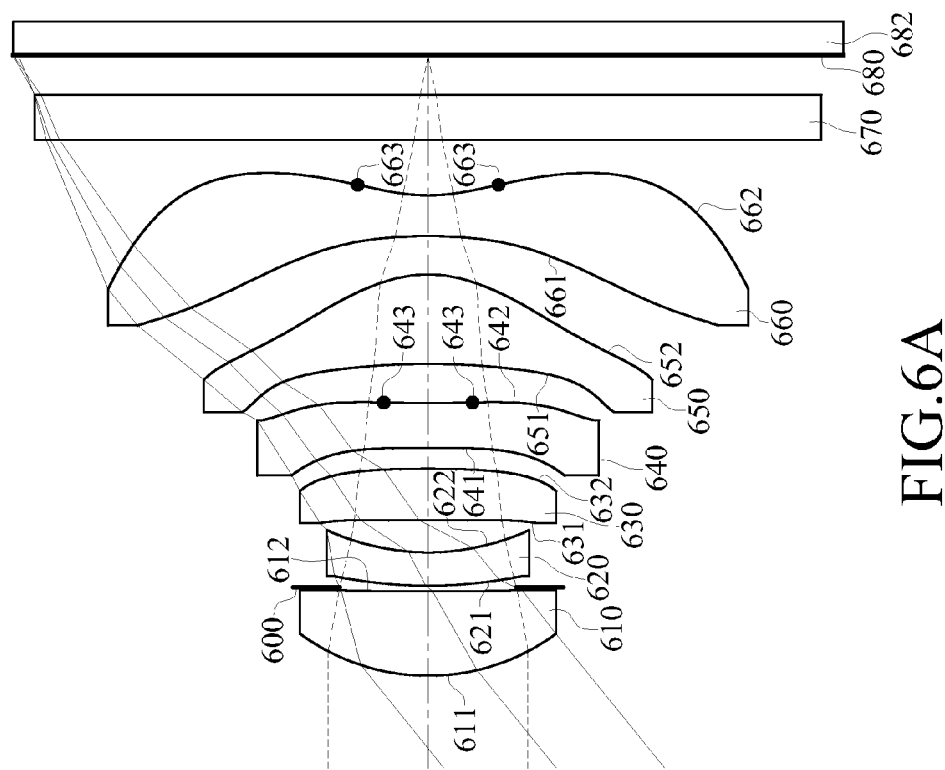
FIG. 6A is a schematic structural view of a sixth embodiment of a photographing optical lens assembly.

FIG. 6A is a schematic structural view of the sixth embodiment of the photographing optical lens assembly. The specific implementation and elements of the sixth embodiment are substantially the same as those in the first embodiment. The element symbols in the sixth embodiment all begin with "6" which correspond to those in the first embodiment with the same function or structure. For conciseness, only the differences are illustrated below, and the similarities will not be repeated herein.

In this embodiment, for example, the reference wavelength of the light received by the photographing optical lens assembly 60 is 587.6 nm, but the reference wavelength may be adjusted according to actual requirements, and is not limited to the wavelength value mentioned above.

In this embodiment, a first lens element 610 with positive refractive power comprises a convex object-side surface 611. A second lens element 620 has negative refractive power. A fourth lens element 640 with at least one inflection point 643 comprises a convex object-side surface 641. A fifth lens element 650 with positive refractive power comprises a concave object-side surface 651 and a convex image-side surface 652. A sixth lens element 660 with negative refractive power comprises concave image-side surface 662 and at least one inflection point 663. In addition, a stop is between the first lens element 610 and the second lens element 620. In this embodiment, the stop is, for example, an aperture stop 600.

The detailed data of the photographing optical lens assembly 60 is as shown in Table 6-1 below.

TABLE 6-1

Embodiment 6
f = 2.70 mm, Fno = 2.50, HFOV = 38.9 deg.

| Surface # | | Curvature Radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 1.169910 (ASP) | 0.456 | Plastic | 1.544 | 55.9 | 2.18 |
| 2 | | 75.572700 (ASP) | 0.020 | | | | |
| 3 | Ape. Stop | Plano | 0.010 | | | | |
| 4 | Lens 2 | 2.292990 (ASP) | 0.180 | Plastic | 1.650 | 21.4 | −4.13 |
| 5 | | 1.198710 (ASP) | 0.173 | | | | |
| 6 | Lens 3 | 21.568000 (ASP) | 0.279 | Plastic | 1.544 | 55.9 | 9.33 |
| 7 | | −6.608200 (ASP) | 0.113 | | | | |
| 8 | Lens 4 | −31.158500 (ASP) | 0.242 | Plastic | 1.633 | 23.4 | −9.17 |
| 9 | | 7.148900 (ASP) | 0.211 | | | | |
| 10 | Lens 5 | −4.210200 (ASP) | 0.484 | Plastic | 1.544 | 55.9 | 1.40 |
| 11 | | −0.671400 (ASP) | 0.207 | | | | |
| 12 | Lens 6 | −2.859100 (ASP) | 0.220 | Plastic | 1.544 | 55.9 | −1.23 |
| 13 | | 0.893580 (ASP) | 0.300 | | | | |
| 14 | IR-cut filter | Plano | 0.242 | Glass | 1.517 | 64.2 | — |
| 15 | | Plano | 0.214 | | | | |
| 16 | Image | Plano | — | | | | |

Note:
Reference wavelength is d-line 587.6 nm, and ASP represents aspheric.

In Table 6-1, from the object-side surface 611 to the image-side surface 662, all surfaces can be aspheric, and the aspheric surfaces can satisfy Condition ASP, but are not limited thereto. As for the parameters of the aspheric surfaces, reference is made to Table 6-2 below.

TABLE 6-2

Aspheric Coefficients

| Surface# | 1 | 2 | 4 |
|---|---|---|---|
| K | −4.30835E−01 | 5.00000E+01 | −1.63885E+01 |
| $A_4$ | 4.31747E−02 | 1.04952E−01 | 3.92158E−02 |
| $A_6$ | 3.04722E−02 | −1.09247E−01 | 7.05671E−02 |
| $A_8$ | −8.45348E−02 | — | — |
| $A_{10}$ | 2.81894E−01 | — | — |
| $A_{12}$ | −3.57304E−01 | — | — |

| Surface# | 5 | 6 | 7 |
|---|---|---|---|
| K | −4.55601E+00 | −8.59802E+01 | 4.23073E+01 |
| $A_4$ | 9.46911E−02 | −7.26375E−02 | −1.57851E−01 |
| $A_6$ | 1.14332E−01 | −2.50995E−01 | −2.46630E−01 |
| $A_8$ | 6.32428E−01 | −8.54380E−04 | 8.95339E−02 |
| $A_{10}$ | −2.32978E+00 | −8.20425E−01 | −6.48912E−01 |
| $A_{12}$ | 3.98089E+00 | 3.92693E−01 | −2.93592E−01 |

| Surface# | 8 | 9 | 10 |
|---|---|---|---|
| K | 5.00000E+01 | −9.00000E+01 | 1.50218E+01 |
| $A_4$ | −4.37978E−01 | −2.28814E−01 | −3.84874E−03 |
| $A_6$ | −2.58356E−01 | −1.04095E−01 | −1.22217E−01 |
| $A_8$ | 4.16538E−01 | −4.93481E−03 | 1.48942E+00 |
| $A_{10}$ | 1.73955E−01 | 1.06772E−01 | −5.45124E+00 |
| $A_{12}$ | −5.82489E−01 | 1.19135E−01 | 8.99912E+00 |
| $A_{14}$ | | | −7.65790E+00 |
| $A_{16}$ | | | 2.66959E+00 |

| Surface# | 11 | 12 | 13 |
|---|---|---|---|
| K | −3.31632E+00 | −4.86810E+01 | −9.05639E+00 |
| $A_4$ | −1.92393E−01 | −5.18015E−01 | −3.09567E−01 |
| $A_6$ | 4.08536E−02 | 7.25294E−01 | 3.54311E−01 |
| $A_8$ | 6.52749E−01 | −6.37437E−01 | −3.16395E−01 |
| $A_{10}$ | −6.10320E−01 | 3.83382E−01 | 1.79595E−01 |
| $A_{12}$ | −1.49034E−01 | −1.46329E−01 | −6.43550E−02 |
| $A_{14}$ | 3.66648E−01 | 3.14405E−02 | 1.29315E−02 |
| $A_{16}$ | −1.15623E−01 | −2.89065E−03 | −1.09534E−03 |

The content of Table 6-3 may be deduced from Table 6-1.

TABLE 6-3

| Embodiment 6 | | | |
|---|---|---|---|
| f (mm) | 2.70 | $f/f_1$ | 1.24 |
| Fno | 2.50 | $|f/f_3| + |f/f_4|$ | 0.58 |
| HFOV(deg.) | 38.9 | $|f/f_5| + |f/f_6|$ | 4.13 |
| FOV(deg) | 77.8 | TTL (mm) | 3.27 |
| $V_1 − V_2$ | 34.5 | TTL/f | 1.21 |
| $CT_2 + CT_3 + CT_4$ | 0.70 | TTL/ImgH | 1.46 |
| ΣCT | 1.86 | | |

FIG. 6B is a graph of longitudinal spherical aberration curves when the lights having wavelengths of 486.1 nm, 587.6 nm, and 656.3 nm are projected in the photographing optical lens assembly 60 in FIG. 3A. It can be observed from FIG. 6B that for the lights of the wavelengths of 486.1 nm, 587.6 nm, and 656.3 nm, the corresponding longitudinal spherical aberrations generated by the photographing optical lens assembly 60 are within a range of −0.02 mm to 0.01 mm.

FIG. 6C is a graph of astigmatic field curves when light having wavelength of 587.6 nm is projected in the photographing optical lens assembly 60 in FIG. 6A. It can be observed from FIG. 6C that the astigmatic field curvature of the tangential plane is within a range of −0.025 mm to 0.01 mm, and the astigmatic field curvature of the sagittal plane is within a range of −0.025 mm to 0 mm.

FIG. 6D is a graph of a distortion curve when light having wavelength of 587.6 is projected in the photographing optical lens assembly 60 in FIG. 6A. It can be observed from FIG. 6D that the distortion ratio is within a range of −0.5% to 4%. As shown in FIGS. 6B to 6D, the photographing optical lens assembly 60, designed according to the sixth embodiment, is capable of effectively correcting various aberrations.

The Seventh Embodiment

Embodiment 7

Figure 7A:
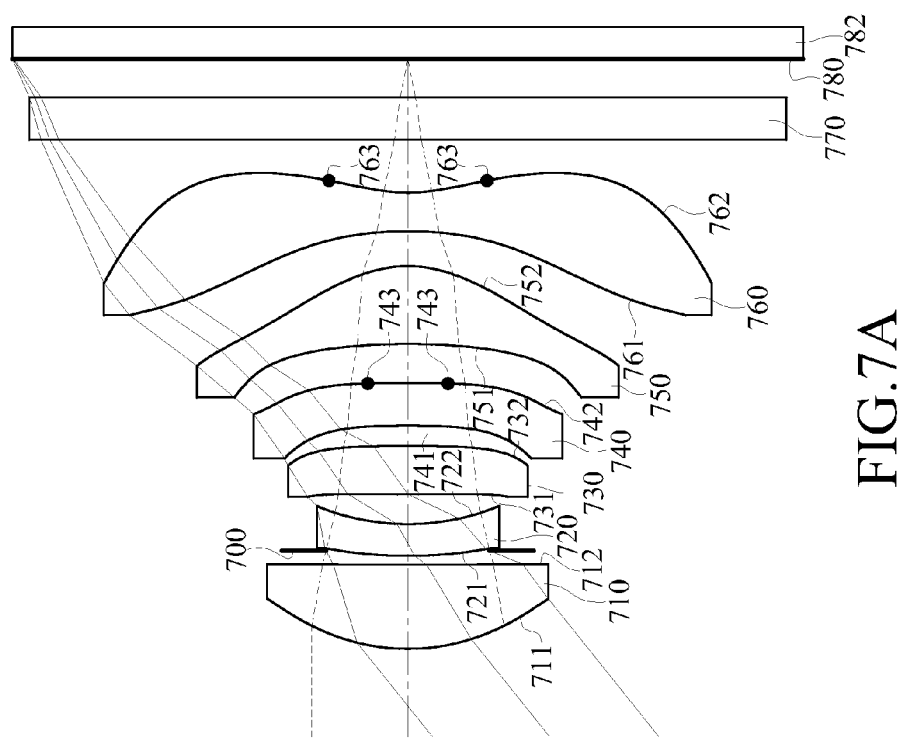
FIG. 7A is a schematic structural view of a seventh embodiment of a photographing optical lens assembly.

FIG. 7A is a schematic structural view of the seventh embodiment of the photographing optical lens assembly. The specific implementation and elements of the seventh embodiment are substantially the same as those in the first embodiment. The element symbols in the seventh embodiment all begin with "7" which correspond to those in the first embodiment with the same function or structure. For conciseness, only the differences are illustrated below, and the similarities will not be repeated herein.

In this embodiment, for example, the reference wavelength of the light received by the photographing optical lens assembly 70 is 587.6 nm, but the reference wavelength may be adjusted according to actual requirements, and is not limited to the wavelength value mentioned above.

In this embodiment, a first lens element 710 with positive refractive power comprises a convex object-side surface 711. A second lens element 720 has negative refractive power. A fourth lens element 740 with at least one inflection point 743 comprises a concave object-side surface 741. A fifth lens element 750 with positive refractive power comprises a concave object-side surface 751 and a convex image-side surface 752. A sixth lens element 760 with negative refractive power comprises concave image-side surface 762 and at least one inflection point 763. In addition, a stop is disposed between the first lens element 710 and the second lens element 720. In this embodiment, the stop is, for example, an aperture stop 700.

The detailed data of the photographing optical lens assembly 70 is as shown in Table 7-1 below.

TABLE 7-1

Embodiment 7
f = 2.73 mm, Fno = 2.50, HFOV = 38.6 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 1.187860 (ASP) | 0.479 | Plastic | 1.544 | 55.9 | 2.13 |
| 2 | | −40.960600 (ASP) | 0.080 | | | | |

TABLE 7-1-continued

Embodiment 7
f = 2.73 mm, Fno = 2.50, HFOV = 38.6 deg.

| Surface # | | Curvature radius (mm) | Thickness (mm) | Material | Index | Abbe # | Focal length (mm) |
|---|---|---|---|---|---|---|---|
| 3 | Ape. Stop | Plano | -0.03 | | | | |
| 4 | Lens 2 | 2.642460 (ASP) | 0.180 | Plastic | 1.650 | 21.4 | -4.18 |
| 5 | | 1.302880 (ASP) | 0.171 | | | | |
| 6 | Lens 3 | 16.848400 (ASP) | 0.273 | Plastic | 1.544 | 55.9 | 15.81 |
| 7 | | -17.471900 (ASP) | 0.116 | | | | |
| 8 | Lens 4 | -6.768500 (ASP) | 0.242 | Plastic | 1.633 | 23.4 | -16.63 |
| 9 | | -19.230800 (ASP) | 0.222 | | | | |
| 10 | Lens 5 | -4.060200 (ASP) | 0.443 | Plastic | 1.544 | 55.9 | 1.40 |
| 11 | | -0.665650 (ASP) | 0.198 | | | | |
| 12 | Lens 6 | -2.185630 (ASP) | 0.220 | Plastic | 1.544 | 55.9 | -1.18 |
| 13 | | 0.940810 (ASP) | 0.300 | | | | |
| 14 | IR-cut filter | Plano | 0.242 | Glass | 1.517 | 64.2 | — |
| 15 | | Plano | 0.216 | | | | |
| 16 | Image | Plano | — | | | | |

Note:
Reference wavelength is d-line 587.6 nm, and ASP represents aspheric.

In Table 7-1, from the object-side surface 711 to the image-side surface 762, all surfaces can be aspheric, and the aspheric surfaces can satisfy Condition ASP, but are not limited thereto. As for the parameters of the aspheric surfaces, reference is made to Table 7-2 below.

TABLE 7-3

| | Aspheric Coefficients | | |
|---|---|---|---|
| Surface# | 1 | 2 | 4 |
| K | -5.46349E-01 | -9.00000E+01 | -1.98018E+01 |
| $A_4$ | 3.05713E-02 | 1.07855E-01 | 1.14208E-01 |
| $A_6$ | 2.26096E-02 | -1.50136E-01 | 8.19041E-02 |
| $A_8$ | -1.23903E-01 | — | — |
| $A_{10}$ | 2.56630E-01 | — | — |
| $A_{12}$ | -3.40305E-01 | — | — |
| Surface# | 5 | 6 | 7 |
| K | -4.76446E+00 | -9.00000E+01 | 5.00000E+01 |
| $A_4$ | 1.10680E-01 | -1.70694E-01 | -2.68926E-01 |
| $A_6$ | 1.95196E-01 | -1.01089E-01 | -2.35734E-01 |
| $A_8$ | 4.90030E-01 | -9.15420E-02 | 1.56508E-01 |
| $A_{10}$ | -2.25502E+00 | -7.53512E-01 | -6.87952E-01 |
| $A_{12}$ | 3.98115E+00 | 3.92659E-01 | -9.61090E-01 |
| Surface# | 8 | 9 | 10 |
| K | 3.97062E+01 | 5.00000E+01 | 1.40335E+01 |
| $A_4$ | -4.64583E-01 | -2.96083E-01 | -6.47509E-02 |
| $A_6$ | -4.28981E-01 | -1.27969E-01 | -1.52770E-01 |
| $A_8$ | 4.85700E-01 | -9.58955E-03 | 1.56259E+00 |
| $A_{10}$ | 1.19032E-01 | 1.49976E-01 | -5.42538E+00 |
| $A_{12}$ | -1.07431E+00 | 1.97644E-01 | 8.98309E+00 |
| $A_{14}$ | | | -7.68275E+00 |
| $A_{16}$ | | | 2.65073E+00 |
| Surface# | 11 | 12 | 13 |
| K | -3.39260E+00 | -3.09637E+01 | -1.00397E+01 |
| $A_4$ | -2.06270E-01 | -5.06979E-01 | -3.04985E-01 |
| $A_6$ | 4.46517E-02 | 7.26700E-01 | 3.50458E-01 |
| $A_8$ | 6.51562E-01 | -6.37662E-01 | -3.16052E-01 |
| $A_{10}$ | -6.10527E-01 | 3.83099E-01 | 1.79774E-01 |
| $A_{12}$ | -1.48836E-01 | -1.46422E-01 | -6.43551E-02 |

TABLE 7-3-continued

| | Aspheric Coefficients | | |
|---|---|---|---|
| $A_{14}$ | 3.66870E-01 | 3.14370E-02 | 1.29203E-02 |
| $A_{16}$ | -1.15432E-01 | -2.87205E-03 | -1.09045E-03 |

The content of Table 7-3 may be deduced from Table 7-1.

TABLE 7-3

Embodiment 7

| f (mm) | 2.73 | $f/f_1$ | 1.28 |
|---|---|---|---|
| Fno | 2.50 | $|f/f_3| + |f/f_4|$ | 0.34 |
| HFOV(deg.) | 38.6 | $|f/f_5| + |f/f_6|$ | 4.26 |
| FOV(deg) | 77.2 | TTL (mm) | 3.27 |
| $V_1 - V_2$ | 34.5 | TTL/f | 1.20 |
| $CT_2 + CT_3 + CT_4$ | 0.70 | TTL/ImgH | 1.46 |
| $\Sigma CT$ | 1.84 | | |

FIG. 7B is a graph of longitudinal spherical aberration curves when the lights having wavelengths of 486.1 nm, 587.6 nm, and 656.3 nm are projected in the photographing optical lens assembly 70 in FIG. 7A. It can be observed from FIG. 7B that for the lights of the wavelengths of 486.1 nm, 587.6 nm, and 656.3 nm, the corresponding longitudinal spherical aberrations generated by the photographing optical lens assembly 70 are within a range of −0.025 mm to 0.01 mm.

FIG. 7C is a graph of astigmatic field curves when light having wavelength of 587.6 nm is projected in the photographing optical lens assembly 70 in FIG. 7A. It can be observed from FIG. 7C that the astigmatic field curvature of the tangential plane is within a range of −0.025 mm to 0 mm, and the astigmatic field curvature of the sagittal plane is within a range of −0.025 mm to 0 mm.

FIG. 7D is a graph of a distortion curve when light having wavelength of 587.6 is projected in the photographing optical lens assembly 70 in FIG. 7A. It can be observed from FIG. 7D that the distortion ratio is within a range of −0.5% to 4%. As shown in FIGS. 7B to 7D, the photographing optical lens assembly 70, designed according to the seventh embodiment, is capable of effectively correcting various aberrations.

The Eighth Embodiment

Embodiment 8

Figure 8A:
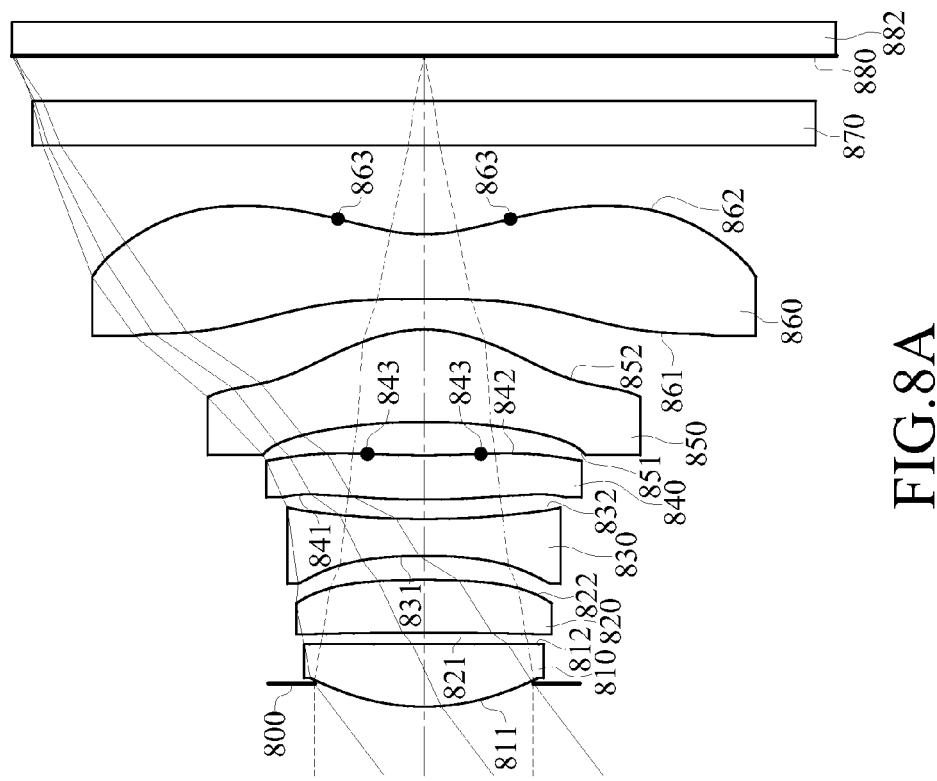
FIG. 8A is a schematic structural view of an eighth embodiment of a photographing optical lens assembly.

FIG. 8A is a schematic structural view of the eighth embodiment of the photographing optical lens assembly. The specific implementation and elements of the eighth embodiment are substantially the same as those in the first embodiment. The element symbols in the eighth embodiment all begin with "8" which correspond to those in the first embodiment with the same function or structure. For conciseness, only the differences are illustrated below, and the similarities will not be repeated herein.

In this embodiment, for example, the reference wavelength of the light received by the photographing optical lens assembly 80 is 587.6 nm, but the reference wavelength may be adjusted according to actual requirements, and is not limited to the wavelength value mentioned above.

In this embodiment, a first lens element 810 with positive refractive power comprises a convex object-side surface 811. A second lens element 820 has positive refractive power. A fourth lens element 840 with at least one inflection point 843 comprises a convex object-side surface 841. A fifth lens element 850 with positive refractive power comprises a concave object-side surface 851 and a convex image-side surface 852. A sixth lens element 860 with negative refractive power comprises concave image-side surface 862 and at least one inflection point 863.

The detailed data of the photographing optical lens assembly 80 is as shown in Table 8-1 below.

TABLE 8-1

Embodiment 8
f = 2.92 mm, Fno = 2.45, HFOV = 37.1 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Ape. Stop | Plano | −0.125 | | | | |
| 2 | Lens 1 | 1.233850 (ASP) | 0.340 | Plastic | 1.544 | 55.9 | 2.34 |
| 3 | | 34.802900 (ASP) | 0.063 | | | | |
| 4 | Lens 2 | −19.519800 (ASP) | 0.287 | Plastic | 1.544 | 55.9 | 12.17 |
| 5 | | −4.968900 (ASP) | 0.131 | | | | |
| 6 | Lens 3 | −2.660860 (ASP) | 0.200 | Plastic | 1.640 | 23.3 | −2.64 |
| 7 | | 4.745800 (ASP) | 0.105 | | | | |
| 8 | Lens 4 | 3.284500 (ASP) | 0.242 | Plastic | 1.640 | 23.3 | 17.40 |
| 9 | | 4.525700 (ASP) | 0.181 | | | | |
| 10 | Lens 5 | −3.707200 (ASP) | 0.503 | Plastic | 1.544 | 55.9 | 1.70 |
| 11 | | −0.774920 (ASP) | 0.166 | | | | |
| 12 | Lens 6 | −46.283500 (ASP) | 0.352 | Plastic | 1.544 | 55.9 | −1.55 |
| 13 | | 0.860580 (ASP) | 0.483 | | | | |
| 14 | IR-cut filter | Plano | 0.242 | Glass | 1.517 | 64.2 | — |
| 15 | | Plano | 0.248 | | | | |
| 16 | Image | Plano | — | | | | |

Note:
Reference wavelength is d-line 587.6 nm; ASP represents aspheric.

In Table 8-1, from the object-side surface 811 to the image-side surface 862, all surfaces can be aspheric, and the aspheric surfaces can satisfy Condition ASP, but are not limited thereto. As for the parameters of the aspheric surfaces, reference is made to Table 8-2 below.

TABLE 8-2

Aspheric Coefficients

| Surface# | 2 | 3 | 4 |
|---|---|---|---|
| K | −6.75853E−01 | −2.85566E+03 | −1.65407E+01 |
| $A_4$ | 2.64406E−02 | −1.10132E−02 | −5.81181E−03 |
| $A_6$ | −7.05973E−02 | −3.66303E−02 | 3.32637E−02 |
| $A_8$ | 7.11239E−02 | — | — |
| $A_{10}$ | −2.85165E−01 | — | — |
| $A_{12}$ | −5.59245E−01 | — | — |

| Surface# | 5 | 6 | 7 |
|---|---|---|---|
| K | −8.13513E−01 | −1.02594E+01 | 3.52836E+01 |
| $A_4$ | −1.70712E−01 | −2.18872E−01 | −4.02672E−03 |
| $A_6$ | −4.69232E−01 | −6.69545E−01 | −1.86248E−01 |
| $A_8$ | 5.19047E−01 | 3.75061E−01 | 1.56966E−01 |
| $A_{10}$ | −1.24795E+00 | 6.73119E−01 | −2.93286E−01 |
| $A_{12}$ | 1.39847E+00 | 9.09258E−01 | 3.39430E−01 |

| Surface# | 8 | 9 | 10 |
|---|---|---|---|
| K | −8.86008E+01 | −2.23461E+02 | 1.65177E+01 |
| $A_4$ | −5.12809E−02 | −1.35298E−01 | −4.17692E−02 |
| $A_6$ | −6.44124E−02 | −7.07064E−02 | −5.55749E−02 |
| $A_8$ | 1.34200E−01 | 3.34339E−02 | 1.47891E+00 |
| $A_{10}$ | −8.03097E−02 | 7.93163E−02 | −5.37126E+00 |
| $A_{12}$ | −4.60849E−01 | 3.04743E−02 | 9.05826E+00 |
| $A_{14}$ | | | −7.63061E+00 |
| $A_{16}$ | | | 2.60899E+00 |

| Surface# | 11 | 12 | 13 |
|---|---|---|---|
| K | −3.51063E+00 | 1.00000E+00 | −7.10939E+00 |
| $A_4$ | −1.46116E−01 | −4.70411E−01 | −2.96714E−01 |
| $A_6$ | 1.05681E−01 | 7.19771E−01 | 3.44684E−01 |
| $A_8$ | 6.57285E−01 | −6.40101E−01 | −3.03202E−01 |
| $A_{10}$ | −6.29942E−01 | 3.83452E−01 | 1.75722E−01 |
| $A_{12}$ | −1.61059E−01 | −1.46139E−01 | −6.42204E−02 |
| $A_{14}$ | 3.62914E−01 | 3.14937E−02 | 1.31625E−02 |
| $A_{16}$ | −1.10290E−01 | −2.92711E−03 | −1.13690E−03 |

The content of Table 8-3 may be deduced from Table 8-1.

TABLE 8-3

| Embodiment 6 | | | |
|---|---|---|---|
| f (mm) | 2.92 | $f/f_1$ | 1.24 |
| Fno | 2.45 | $|f/f_3| + |f/f_4|$ | 1.27 |
| HFOV(deg.) | 37.1 | $|f/f_5| + |f/f_6|$ | 3.60 |
| FOV(deg) | 74.2 | TTL (mm) | 3.46 |
| $V_1 - V_2$ | 0.0 | TTL/f | 1.19 |
| $CT_2 + CT_3 + CT_4$ | 0.73 | TTL/ImgH | 1.55 |
| $\Sigma CT$ | 1.92 | | |

FIG. 8B is a graph of longitudinal spherical aberration curves when the lights having wavelengths of 486.1 nm, 587.6 nm, and 656.3 nm are projected in the photographing optical lens assembly 80 in FIG. 8A. It can be observed from FIG. 8B that for the lights of the wavelengths of 486.1 nm, 587.6 nm, and 656.3 nm, the corresponding longitudinal spherical aberrations generated by the photographing optical lens assembly 80 are within a range of −0.02 mm to 0.01 mm.

FIG. 8C is a graph of astigmatic field curves when light having wavelength of 587.6 nm is projected in the photographing optical lens assembly 80 in FIG. 8A. It can be observed from FIG. 8C that the astigmatic field curvature of the tangential plane is within a range of −0.025 mm to 0.005 mm, and the astigmatic field curvature of the sagittal plane is within a range of −0.025 mm to 0 mm.

FIG. 8D is a graph of a distortion curve when light having wavelength of 587.6 is projected in the photographing optical lens assembly 80 in FIG. 8A. It can be observed from FIG. 8D that the distortion ratio is within a range of 0% to 2.5%. As shown in FIGS. 8B to 8D, the photographing optical lens assembly 80, designed according to the eighth embodiment, is capable of effectively correcting various aberrations.

The Ninth Embodiment

Embodiment 9

Figure 9A:
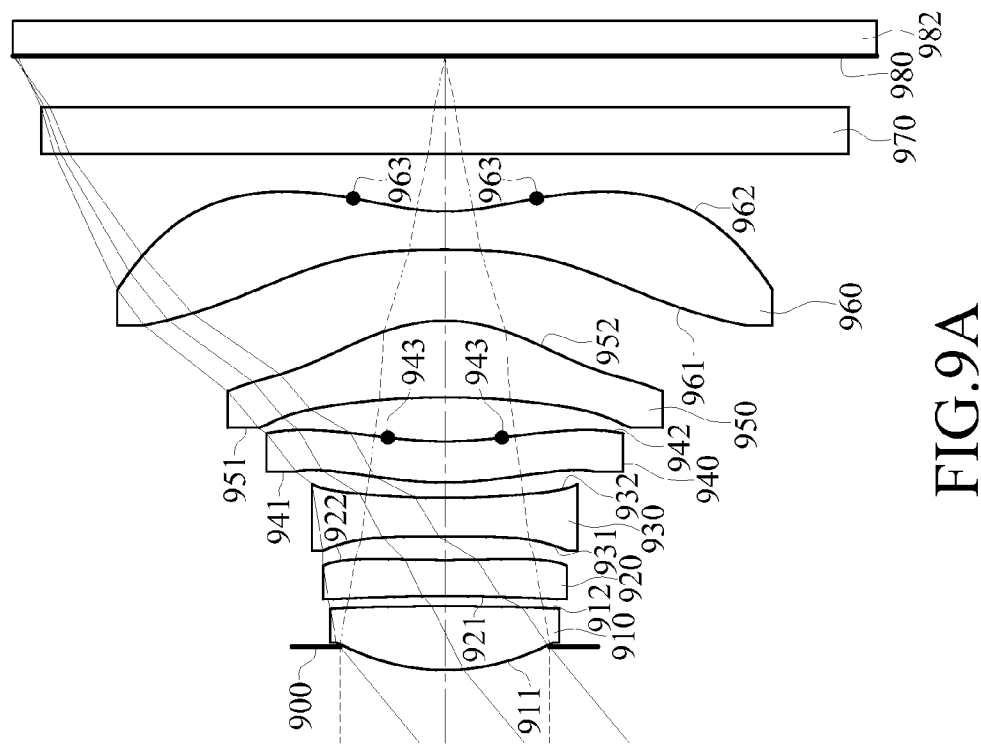
FIG. 9A is a schematic structural view of a ninth embodiment of a photographing optical lens assembly.

FIG. 9A is a schematic structural view of the ninth embodiment of the photographing optical lens assembly. The specific implementation and elements of the ninth embodiment are substantially the same as those in the first embodiment. The element symbols in the ninth embodiment all begin with "9" which correspond to those in the first embodiment with the same function or structure. For conciseness, only the differences are illustrated below, and the similarities will not be repeated herein.

In this embodiment, for example, the reference wavelength of the light received by the photographing optical lens assembly 90 is 587.6 nm, but the reference wavelength may be adjusted according to actual requirements, and is not limited to the wavelength value mentioned above.

In this embodiment, a first lens element 910 with positive refractive power comprises a convex object-side surface 911. A second lens element 920 has negative refractive power. A fourth lens element 940 with at least one inflection point 943 comprises a convex object-side surface 941. A fifth lens element 950 with positive refractive power comprises a concave object-side surface 951 and a convex image-side surface 952. A sixth lens element 960 with negative refractive power comprises concave object-side surface 962 and at least one inflection point 963.

The detailed data of the photographing optical lens assembly 90 is as shown in Table 9-1 below.

TABLE 9-1

Embodiment 9
f = 2.67 mm, Fno = 2.45, HFOV = 39.6 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Ape. | Plano | −0.12 | | | | |
| 2 | Lens 1 | 1.135740 (ASP) | 0.332 | Plastic | 1.544 | 55.9 | 2.00 |
| 3 | | −24.512300 (ASP) | 0.054 | | | | |
| 4 | Lens 2 | −9.237600 (ASP) | 0.188 | Plastic | 1.633 | 23.4 | −6.16 |
| 5 | | 6.789600 (ASP) | 0.123 | | | | |
| 6 | Lens 3 | −19.389600 (ASP) | 0.200 | Plastic | 1.634 | 23.8 | −5.45 |
| 7 | | 4.219900 (ASP) | 0.080 | | | | |
| 8 | Lens 4 | 1.680730 (ASP) | 0.214 | Plastic | 1.583 | 30.2 | 20.04 |
| 9 | | 1.870900 (ASP) | 0.230 | | | | |
| 10 | Lens 5 | −4.101700 (ASP) | 0.399 | Plastic | 1.544 | 55.9 | 1.89 |
| 11 | | −0.848840 (ASP) | 0.370 | | | | |
| 12 | Lens 6 | −6.287400 (ASP) | 0.200 | Plastic | 1.544 | 55.9 | −1.69 |
| 13 | | 1.088310 (ASP) | 0.300 | | | | |
| 14 | IR-cut filter | Plano | 0.242 | Glass | 1.517 | 64.2 | — |
| 15 | | Plano | 0.269 | | | | |
| 16 | Image | Plano | — | | | | |

Note:
Reference wavelength is d-line 587.6 nm, ASP represents aspheric.

In Table 9-1, from the object-side surface 911 to the image-side surface 962, all surfaces are aspheric, and the aspheric surfaces can satisfy Condition ASP, but are not limited thereto. As for the parameters of the aspheric surfaces, reference is made to Table 9-2 below.

TABLE 9-2

| Aspheric Coefficients | | | |
|---|---|---|---|
| Surface# | 2 | 3 | 4 |
| K | −5.99614E−01 | −3.00000E+01 | 1.00000E+00 |
| $A_4$ | 3.31753E−02 | −3.21620E−02 | −1.20424E−02 |
| $A_6$ | −6.08529E−02 | −5.17978E−02 | 8.68068E−02 |
| $A_8$ | −4.35372E−03 | — | — |
| $A_{10}$ | −3.01361E−01 | — | — |
| $A_{12}$ | −6.71808E−01 | — | — |

TABLE 9-2-continued

| Aspheric Coefficients | | | |
|---|---|---|---|
| Surface# | 5 | 6 | 7 |
| K | −6.62947E+01 | −9.00000E+01 | 3.03452E+01 |
| $A_4$ | −1.49255E−01 | −1.82932E−01 | −1.07440E−01 |
| $A_6$ | −4.31877E−01 | −9.17964E−01 | −8.50076E−02 |
| $A_8$ | 3.14797E−01 | 2.87920E−01 | 2.95039E−01 |
| $A_{10}$ | −2.27756E+00 | 1.24187E+00 | −5.58944E−02 |
| $A_{12}$ | 2.98465E+00 | 1.15659E+00 | 9.56404E−01 |
| Surface# | 8 | 9 | 10 |
| K | −2.20284E+01 | −1.99964E+01 | 1.58280E+01 |
| $A_4$ | −9.16560E−02 | −1.19830E−01 | −4.95977E−03 |
| $A_6$ | −6.38013E−02 | −3.89992E−02 | −3.22859E−02 |
| $A_8$ | 1.95004E−01 | 4.51386E−02 | 1.44130E+00 |
| $A_{10}$ | 3.38471E−02 | 3.70288E−02 | −5.42536E+00 |
| $A_{12}$ | −6.55069E−01 | −5.36861E−02 | 9.01915E+00 |
| $A_{14}$ | | | −7.63461E+00 |
| $A_{16}$ | | | 2.69450E+00 |
| Surface# | 11 | 12 | 13 |
| K | −3.02824E+00 | −6.89203E+00 | −8.84713E+00 |
| $A_4$ | −1.03054E−01 | −4.89512E−01 | −3.25473E−01 |
| $A_6$ | 9.16833E−02 | 7.23507E−01 | 3.57829E−01 |
| $A_8$ | 6.31677E−01 | −6.39357E−01 | −3.10111E−01 |
| $A_{10}$ | −6.40849E−01 | 3.83154E−01 | 1.77159E−01 |
| $A_{12}$ | −1.61808E−01 | −1.46306E−01 | −6.43948E−02 |
| $A_{14}$ | 3.66909E−01 | 3.14887E−02 | 1.31043E−02 |
| $A_{16}$ | −1.05276E−01 | −2.88545E−03 | −1.11644E−03 |

The content of Table 9-3 may be deduced from Table 9-1.

TABLE 9-3

| Embodiment 9 | | | |
|---|---|---|---|
| f (mm) | 2.67 | $f/f_1$ | 1.33 |
| Fno | 2.45 | $|f/f_3| + |f/f_4|$ | 0.62 |
| HFOV(deg.) | 39.6 | $|f/f_5| + |f/f_6|$ | 3.00 |
| FOV(deg) | 79.2 | TTL (mm) | 3.12 |
| $V_1 - V_2$ | 32.5 | TTL/f | 1.17 |
| $CT_2 + CT_3 + CT_4$ | 0.60 | TTL/ImgH | 1.39 |
| ΣCT | 1.53 | | |

FIG. 9B is a graph of longitudinal spherical aberration curves when the lights having wavelengths of 486.1 nm, 587.6 nm, and 656.3 nm are projected in the photographing optical lens assembly 90 in FIG. 7A. It can be observed from FIG. 9B that for the lights of the wavelengths of 486.1 nm, 587.6 nm, and 656.3 nm, the corresponding longitudinal spherical aberrations generated by the photographing optical lens assembly 90 are within a range of −0.025 mm to 0.02 mm.

FIG. 9C is a graph of astigmatic field curves when light having wavelength of 587.6 nm is projected in the photographing optical lens assembly 90 in FIG. 9A. It can be observed from FIG. 9C that the astigmatic field curvature of the tangential plane is within a range of −0.04 mm to 0.025 mm, and the astigmatic field curvature of the sagittal plane is within a range of −0.025 mm to 0.01 mm.

FIG. 9D is a graph of a distortion curve when light having wavelength of 587.6 is projected in the photographing optical lens assembly 90 in FIG. 9A. It can be observed from FIG. 9D that the distortion ratio is within a range of −0.5% to 2.5%. As shown in FIGS. 9B to 9D, the photographing optical lens assembly 90, designed according to the ninth embodiment, is capable of effectively correcting various aberrations.

The Tenth Embodiment

Embodiment 10

Figure 10A:
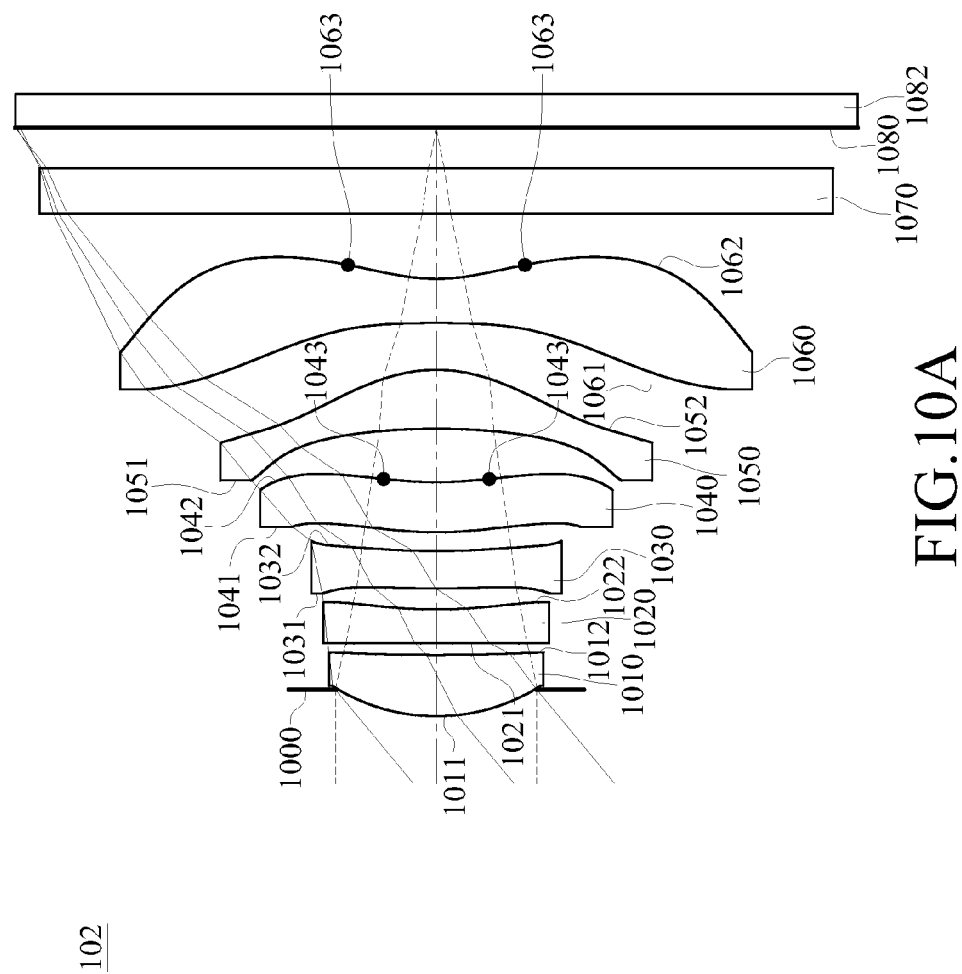
FIG. 10A is a schematic structural view of a first embodiment of a photographing optical lens assembly.

FIG. 10A is a schematic structural view of the tenth embodiment of the photographing optical lens assembly. The specific implementation and elements of the tenth embodiment are substantially the same as those in the first embodiment. The element symbols in the tenth embodiment all begin with "10" which correspond to those in the first embodiment with the same function or structure. For conciseness, only the differences are illustrated below, and the similarities will not be repeated herein.

In this embodiment, for example, the reference wavelength of the light received by the photographing optical lens assembly 102 is 587.6 nm, but the reference wavelength may be adjusted according to actual requirements, and is not limited to the wavelength value mentioned above.

In this embodiment, a first lens element 1010 with positive refractive power comprises a convex object-side surface 1011. A second lens element 1020 has negative refractive power. A fourth lens element 1040 with at least one inflection point 1043 comprises a convex object-side surface 1041. A fifth lens element 1050 with positive refractive power comprises a concave object-side surface 1051 and a convex image-side surface 1052. A sixth lens element 1060 with negative refractive power comprises concave image-side surface 1062 and at least one inflection point 1063.

The detailed data of the photographing optical lens assembly 50 is as shown in Table 5-1 below.

TABLE 10-1

| Embodiment 10 | | | | | | | |
|---|---|---|---|---|---|---|---|
| f = 2.63 mm, Fno = 2.45, HFOV = 39.7 deg. | | | | | | | |
| Surface # | | Curvature radius (mm) | Thickness (mm) | Material | Index | Abbe # | Focal length (mm) |
| 0 | Object | Plano | Infinity | | | | |
| 1 | Ape. Stop | Plano | −0.140 | | | | |
| 2 | Lens 1 | 1.038750 (ASP) | 0.327 | Plastic | 1.544 | 55.9 | 2.08 |
| 3 | | 11.070100 (ASP) | 0.063 | | | | |
| 4 | Lens 2 | 57.558000 (ASP) | 0.180 | Plastic | 1.650 | 21.4 | −3.99 |
| 5 | | 2.475920 (ASP) | 0.112 | | | | |
| 6 | Lens 3 | 5.072700 (ASP) | 0.200 | Plastic | 1.634 | 23.8 | −23.83 |
| 7 | | 3.739700 (ASP) | 0.100 | | | | |
| 8 | Lens 4 | 1.831420 (ASP) | 0.268 | Plastic | 1.544 | 55.9 | 22.80 |
| 9 | | 2.037790 (ASP) | 0.285 | | | | |
| 10 | Lens 5 | −4.002300 (ASP) | 0.315 | Plastic | 1.544 | 55.9 | 1.77 |

TABLE 10-1-continued

Embodiment 10
f = 2.63 mm, Fno = 2.45, HFOV = 39.7 deg.

| Surface # | | Curvature radius (mm) | Thickness (mm) | Material | Index | Abbe # | Focal length (mm) |
|---|---|---|---|---|---|---|---|
| 11 | | −0.798710 (ASP) | 0.250 | | | | |
| 12 | Lens 6 | −7.752600 (ASP) | 0.236 | Plastic | 1.544 | 55.9 | −1.58 |
| 13 | | 0.974320 (ASP) | 0.350 | | | | |
| 14 | IR-cut filter | Plano | 0.242 | Glass | 1.517 | 64.2 | — |
| 15 | | Plano | 0.213 | | | | |
| 16 | Image | Plano | — | | | | |

Note:
Reference wavelength is d-line 587.6 nm, ASP represents aspheric.

In Table 10--1, from the object-side surface 1011 to image-side surface 1062, all the surfaces can be aspheric, and the aspheric surfaces can satisfy Condition ASP, but are not limited thereto. As for the parameters of the aspheric surfaces, reference is made to Table 10-2 below.

TABLE 10-2

| Aspheric Coefficients | | | |
|---|---|---|---|
| Surface# | 2 | 3 | 4 |
| K | −4.10712E−01 | −2.66474E+00 | −3.00000E+01 |
| $A_4$ | 5.61822E−02 | 2.38525E−03 | −7.80687E−02 |
| $A_6$ | 4.48907E−02 | −2.59822E−02 | 1.78863E−01 |
| $A_8$ | 4.83707E−02 | — | — |
| $A_{10}$ | −3.41755E−01 | — | — |
| $A_{12}$ | 4.12332E−01 | — | — |
| Surface# | 5 | 6 | 7 |
| K | −9.78989E+00 | −4.39173E+00 | 2.59678E+01 |
| $A_4$ | −1.06381E−01 | −1.88514E−01 | −2.17319E−01 |
| $A_6$ | −3.20961E−01 | −9.89210E−01 | −1.46966E−01 |
| $A_8$ | 6.95138E−01 | 2.63820E−01 | 2.07711E−01 |
| $A_{10}$ | −2.23654E+00 | 1.12165E+00 | 6.33421E−02 |
| $A_{12}$ | 1.50838E+00 | 2.34183E−01 | 1.74922E+00 |
| Surface# | 8 | 9 | 10 |
| K | −2.25292E+01 | −2.04474E+01 | 1.45567E+01 |
| $A_4$ | −1.80484E−01 | −1.54219E−01 | −9.36454E−02 |
| $A_6$ | −2.50305E−02 | −9.40030E−02 | −3.87628E−02 |
| $A_8$ | 2.52885E−01 | 4.53352E−02 | 1.43575E+00 |
| $A_{10}$ | 1.24402E−02 | 4.36736E−02 | −5.44816E+00 |
| $A_{12}$ | −8.42082E−01 | −8.44201E−02 | 8.99026E+00 |
| $A_{14}$ | | | −7.63581E+00 |
| $A_{16}$ | | | 2.71156E+00 |
| Surface# | 11 | 12 | 13 |
| K | −3.14937E+00 | −1.88490E+01 | −8.01485E+00 |
| $A_4$ | −1.46943E−01 | −5.02953E−01 | −3.24521E−01 |
| $A_6$ | 1.03132E−01 | 7.27947E−01 | 3.53701E−01 |
| $A_8$ | 6.39287E−01 | −6.38489E−01 | −3.11152E−01 |
| $A_{10}$ | −6.35834E−01 | 3.83051E−01 | 1.77138E−01 |
| $A_{12}$ | −1.58872E−01 | −1.46397E−01 | −6.43594E−02 |
| $A_{14}$ | 3.67197E−01 | 3.14689E−02 | 1.31300E−02 |
| $A_{16}$ | −1.07436E−01 | −2.87050E−03 | −1.10350E−03 |

The content of Table 10-3 may be deduced from Table 10-1.

TABLE 10-3

| Embodiment 10 | | | |
|---|---|---|---|
| f (mm) | 2.63 | $f/f_1$ | 1.26 |
| Fno | 2.45 | $|f/f_3| + |f/f_4|$ | 0.23 |
| HFOV(deg.) | 39.7 | $|f/f_5| + |f/f_6|$ | 3.15 |
| FOV(deg) | 79.4 | TTL (mm) | 3.06 |
| $V_1 - V_2$ | 32.5 | TTL/f | 1.16 |
| $CT_2 + CT_3 + CT_4$ | 0.65 | TTL/ImgH | 1.37 |
| ΣCT | 1.53 | | |

Figures 10B, 10C, 10D:
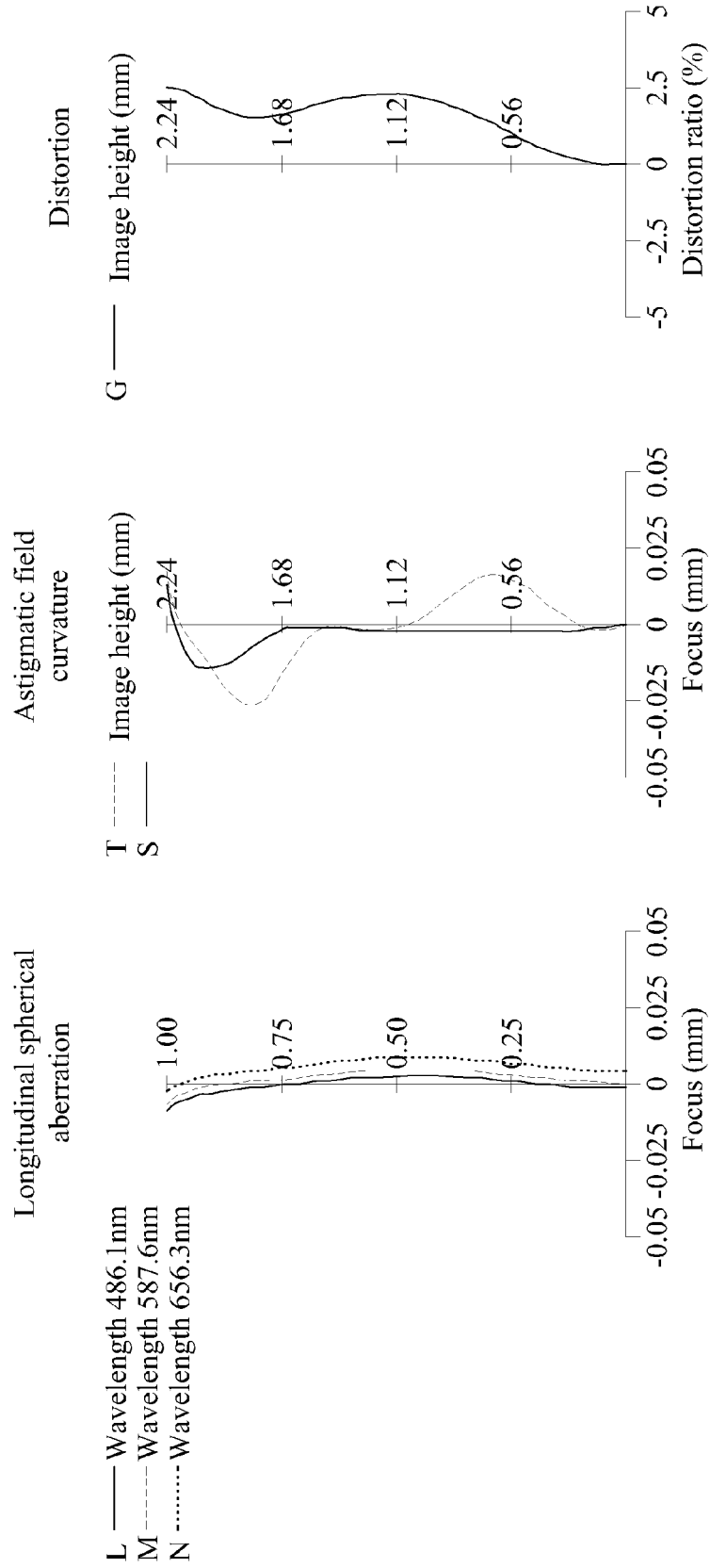
FIG. 10B is a graph of longitudinal spherical aberration curves when the lights having wavelengths of 486.1 nm, 587.6 nm, and 656.3 nm are respectively projected in the photographing optical lens assembly in FIG. 10A.
FIG. 10C is a graph of astigmatic field curves when the light having the wavelength of 587.6 nm is projected in the photographing optical lens assembly in FIG. 10A.
FIG. 10D is a graph of a distortion curve when the light having the wavelength of 587.6 nm is projected in the photographing optical lens assembly in FIG. 10A.

FIG. 10B is a graph of longitudinal spherical aberration curves when the lights having wavelengths of 486.1 nm, 587.6 nm, and 656.3 nm are projected in the photographing optical lens assembly 102 in FIG. 10A. It can be observed from FIG. 10B that for the lights of the wavelengths of 486.1 nm, 587.6 nm, and 656.3 nm, the corresponding longitudinal spherical aberrations generated by the photographing optical lens assembly 102 are within a range of −0.02 mm to 0.015 mm.

FIG. 10C is a graph of astigmatic field curves when light having wavelength of 587.6 nm is projected in the photographing optical lens assembly 102 in FIG. 10A. It can be observed from FIG. 10C that the astigmatic field curvature of the tangential plane is within a range of −0.03 mm to 0.025 mm, and the astigmatic field curvature of the sagittal plane is within a range of −0.02 mm to 0.025 mm.

FIG. 10D is a graph of a distortion curve when light having wavelength of 587.6 is projected in the photographing optical lens assembly 102 in FIG. 10A. It can be observed from FIG. 10D that the distortion ratio is within a range of 0% to 3.0%. As shown in FIGS. 10B to 10D, the photographing optical lens assembly 102, designed according to the tenth embodiment, is capable of effectively correcting various aberrations.

What is claimed is:

1. A photographing optical lens assembly comprising, in order from an object side to an image side:
   a first lens element with positive refractive power comprising a convex object-side surface;
   a second lens element;
   a third lens element comprising an aspheric object-side surface and an aspheric image-side surface;
   a fourth lens element comprising an aspheric object-side surface and an aspheric image-side surface;
   a fifth lens element with positive refractive power comprising an aspheric object-side surface and an aspheric image-side surface; and
   a sixth lens element with negative refractive power comprising an aspheric object-side surface, an aspheric image-side surface and at least one inflection point, the sixth lens element being made of plastic;

the photographing optical lens assembly further comprising an image plane, and satisfying the following condition:

$0.4 < f/f_1 < 2.5$; and 2.5 millimeter (mm) $< TTL < 4.5$ mm;

Wherein f is the focal length of the photographing lens assembly; $f_1$ is the focal length of the first lens element; TTL is an axial distance between the object-side surface of the first lens element and the image plane.

2. The photographing optical lens assembly according to claim 1, wherein the image-side surface of the sixth lens element is concave.

3. The photographing optical lens assembly according to claim 2, wherein the image-side surface of the fifth lens element is convex.

4. The photographing optical lens assembly according to claim 3, wherein the photographing optical lens assembly satisfies the following condition:

$2.5 < |f/f_5| + |f/f_6| < 6.0$ wherein $f_5$ is the focal length of the fifth lens element, and $f_6$ is the focal length of the sixth lens element.

5. The photographing optical lens assembly according to claim 4, wherein the fourth lens element further comprises at least one inflection point.

6. The photographing optical lens assembly according to claim 4, wherein the object-side surface of the fourth lens element is convex, and the object-side surface of the fifth lens element is concave.

7. The photographing optical lens assembly according to claim 4, further comprising an image sensor disposed on the image plane, and the photographing optical lens assembly satisfying the following condition:

$TTL/ImgH < 1.7$;

wherein ImgH is a half of the diagonal length of the effective photosensitive area of the image sensor.

8. The photographing optical lens assembly according to claim 4, wherein the photographing optical lens assembly satisfies:

72° (degree) $< FOV < 85°$;

wherein FOV is the maximal field of view of the photographing optical lens assembly.

9. The photographing optical lens assembly according to claim 4, wherein the photographing optical lens assembly satisfies:

$74° < FOV < 80°$;

wherein FOV is the maximal field of view of the photographing optical lens assembly.

10. The photographing optical lens assembly according to claim 4, wherein the photographing optical lens assembly satisfies:

$28 < V_1 - V_2 < 42$;

wherein $V_1$ is the Abbe number of the first lens element; $V_2$ is the Abbe number of the second lens element.

11. The photographing optical lens assembly according to claim 3, wherein the photographing optical lens assembly satisfies the following condition:

2.8 mm $< TTL < 3.8$ mm.

12. The photographing optical lens assembly according to claim 3, wherein the second lens element has negative refractive power; the first lens element, the second lens element, the third lens element, the fourth lens element, the fifth lens element are made of plastic, the object-side surface and the image-side surface of the first lens element are aspheric and the object-side surface and the image-side surface of the second lens element are aspheric.

13. The photographing optical lens assembly according to claim 1, wherein the photographing optical lens assembly satisfies the following condition:

0.40 mm $< (CT_2 + CT_3 + CT_4) < 0.80$ mm;

wherein $CT_2$ is the central thickness of the second lens element; $CT_3$ is the central thickness of the third lens element; $CT_4$ is the central thickness of the fourth lens element.

14. The photographing optical lens assembly according to claim 13, wherein the second lens element has negative refractive power, and the image-side surface of the sixth lens element is concave.

15. The photographing optical lens assembly according to claim 14, wherein the object-side surface of the fifth lens element is concave, and the photographing optical lens assembly satisfies the following condition:

$0.7 < f/f_1 < 1.8$.

16. The photographing optical lens assembly according to claim 15, wherein the photographing optical lens assembly satisfies the following condition:

$0 < |f/f_3| + |f/f_4| < 0.5$ wherein $f_3$ is the focal length of the third lens element; $f_4$ is the focal length of the fourth lens element.

17. The photographing optical lens assembly according to claim 14, wherein the photographing optical lens assembly satisfies the following condition:

1.0 mm $< \Sigma CT < 2.6$ mm;

wherein $\Sigma CT$ is the sum of the central thicknesses of the first lens element, the second lens element, the third lens element, the fourth lens element, the fifth lens element and the sixth lens element.

18. The photographing optical lens assembly according to claim 14, the photographing optical lens assembly satisfies the following condition:

$0.8 < TTL/f < 1.35$.

19. A photographing optical lens assembly comprising, in order from an object side to an image side:
   a first lens element with positive refractive power comprising a convex object-side surface;
   a second lens element;
   a third lens element comprising an aspheric object-side surface and an aspheric image-side surface;
   a fourth lens element comprising an aspheric object-side surface and an aspheric image-side surface;
   a fifth lens element with positive refractive power comprising an aspheric object-side surface and an aspheric image-side surface; and
   a sixth lens element with negative refractive power comprising an aspheric object-side surface, an aspheric concave image-side surface and at least one inflection point, and the sixth lens element is made of plastic;

wherein the photographing optical lens assembly satisfies the following condition:

$$0.40\ mm<(CT_2+CT_3+CT_4)<0.80\ mm;$$

wherein $CT_2$ is the central thickness of the second lens element; $CT_3$ is the central thickness of the third lens element; $CT_4$ is the central thickness of the fourth lens element.

20. The photographing optical lens assembly according to claim 19, wherein the image-side surface of the fifth lens element is convex.

21. The photographing optical lens assembly according to claim 20, wherein the second lens element has negative refractive power.

22. The photographing optical lens assembly according to claim 20, further comprising a stop disposed between the object side and the second lens element, and the photographing optical lens assembly satisfying the following condition:

$$2.5<|f/f_5|+|f/f_6|<6.0;$$

wherein f is the focal length of the photographing lens assembly; $f_5$ is the focal length of the fifth lens element, and $f_6$ is the focal length of the sixth lens element.

23. The photographing optical lens assembly according to claim 20, wherein the photographing optical lens assembly satisfies the following condition:

$$2.5\ mm<TTL<4.5\ mm;$$

wherein TTL is an axial distance between the object-side surface of the first lens element and the image plane.

24. The photographing optical lens assembly according to claim 20, wherein the photographing optical lens assembly satisfies:

$$72°<FOV<85°;$$

wherein FOV is the maximal field of view of the photographing optical lens assembly.

25. The photographing optical lens assembly according to claim 20, wherein the photographing optical lens assembly satisfies:

$$28<V_1-V_2<42;$$

wherein $V_1$ is the Abbe number of the first lens element; $V_2$ is the Abbe number of the second lens element.

* * * * *